United States Patent [19]
Simmons et al.

[11] Patent Number: 5,837,210
[45] Date of Patent: *Nov. 17, 1998

[54] METHOD FOR PROCESSING GOLD-BEARING SULFIDE ORES INVOLVING PREPARATION OF A SULFIDE CONCENTRATE

[75] Inventors: Gary L. Simmons, Albuquerque, N. Mex.; John C. Gathje, Longmont, Colo.

[73] Assignee: Newmont Gold Company, Denver, Colo.

[*] Notice: The term of this patent shall not extend beyond the expiration date of Pat. No. 5,653,945.

[21] Appl. No.: 735,783

[22] Filed: Oct. 23, 1996

Related U.S. Application Data

[63] Continuation-in-part of Ser. No. 423,839, Apr. 18, 1995, Pat. No. 5,653,945.

[51] Int. Cl.⁶ .............................. B03D 1/00; C01G 7/00; C22B 11/00
[52] U.S. Cl. ............................... 423/26; 423/27; 423/29; 209/166; 209/167
[58] Field of Search ................................ 423/26, 27, 29, 423/DIG. 15; 209/39, 166, 167

[56] References Cited

U.S. PATENT DOCUMENTS

| | | | |
|---|---|---|---|
| 821,516 | 5/1906 | Lovett | 209/39 |
| 5,013,359 | 5/1991 | Fair et al. | 423/26 |
| 5,074,993 | 12/1991 | Kerr et al. | 423/26 |
| 5,411,148 | 5/1995 | Kelebek et al. | 252/61 |
| 5,653,945 | 8/1997 | Gathje et al. | 423/26 |

FOREIGN PATENT DOCUMENTS

| | | | |
|---|---|---|---|
| 2608462 | 6/1988 | France | 209/39 |
| 833320 | 5/1981 | U.S.S.R. | 209/39 |

OTHER PUBLICATIONS

Burger, "Froth Flotation Developments: This Industry Workhorse Goes From Strength to Strength,"E&MJ (Sep. 1983) pp. 67–75.

Onstott et al., "By–Product Molybdenum Flotation From Copper Sulfide Concentrate With Nitrogen Gas In Enclosed Wemco Nitrogen Flotation Machines," Preprint No. 84–65 (1984) Society of Mining Engineers of AIME, Feb. 26–Mar. 1, 1984.

Berglund et al., "Influence of Different Gases In Flotation of Sulphide Minerals," Proceedings of An Engineering Society Foundation Conference on Advances in Coal and Mineral Processing Using Flotation (1989) pp. 71–76, Society for Mining, Metallury and Exploration, Inc., Littleton, Colorado, Dec., 1989.

(List continued on next page.)

*Primary Examiner*—Steven Bos
*Attorney, Agent, or Firm*—Holme Roberts & Owen

[57] ABSTRACT

Provided is a method for processing a gold-bearing sulfide ore which involves maintaining the ore in a substantially oxygen free environment, preferably beginning with comminution of the ore and ending when a desired final concentrate, enriched in sulfide minerals, is obtained by flotation. In one embodiment, nitrogen gas is used to substantially prevent contact between the ore and air during comminution of the ore and during flotation operations. It is believed that oxygen gas present in air detrimentally affects the recovery of sulfide minerals in a flotation concentrate through surface oxidation of sulfide mineral particles. The use of a gas such as nitrogen can significantly reduce the potential for such surface oxidation. Additionally, gases separated from an oxygen plant may be beneficially used, with an oxygen gas stream being used, for example, for pressure oxidation of sulfide mineral materials, and with a nitrogen gas stream being used in comminution and/or flotation operations, resulting in advantageous use of a nitrogen gas by-product stream which has previously been vented to the atmosphere as waste.

40 Claims, 24 Drawing Sheets

OTHER PUBLICATIONS

Martin et al., "Complex Sulphide Ore Processing With Pyrite Flotation by Nitrogen," International Journal of Mineral Processing, 26 (1989) pp. 95–110, Elsevier Science Publishers B.V., Amsterdam, no month.

Jones, "Some Recent Developments in the Measurement and Control of Xanthate, Perxanthate, Sulphide, and Redox Potential in Flotation," International Journal of Mineral Processing, 33 (1991) pp. 193–205, Elsevier Science Publishers B.V., Amsterdam, no month.

Berglund, "Pulp Chemistry in Sulphide Mineral Flotation," International Journal of Mineral Processing, 33 (1991) pp. 21–31, Elsevier Science Publishers B.V., Amsterdam, no month.

Klymowsky et al., "The Role of Oxygen in Xanthate Flotation of Galena, Pyrite and Chalcopyrite," CIM, Bulletin for Jun., pp. 683–688 (1970), Jun.

Rao et al., "Possible Applications of Nitrogen Flotation of Pyrite," Minerals, Materials and Industry (ed. M.T.Jones), Institute of Mining and Metallurgy, pp. 285–293 (1990), no month.

Rao et al., "Adsorption of Amyl Xanthate at Pyrrhotite in the Present of Nitrogen and Implications in Flotation," Can. Metall. Q., vol. 30, No.1, pp. 1–6 (1990), no month.

Xu et al., "Sphalerite Reverse Flotation Using Nitrogen," Proc. Electrochem Soc., vol. 92–17, Proc. Int. Symp. Electrochem. Miner. Met. Process. III, 3rd, pp. 170–190 (1992), no month.

Van Deventer et al., "The Effect of Galvanic Interaction of the Behavior of the Froth Phase During the Flotation of a Complex Sulfide Ore," Minerals Engineering, vol. 6, No. 12, pp. 1217–1229 (1993), no month.

Author unknown, title unknown, Chapter IV, Gases and Aeration, pp. 63–70, date unknown.

Plaskin et al., "Role of Gases in Flotation Reactions," Academy of Sciences, U.S.S.R. Moscow, date unknown.

Kongolo et al., "Improving the efficiency of sulphidization of oxidized copper ores by column and inert gas flotation," Proceedings of COPPER 95–COBRE 95 International Conference, vol. II, The Metallurgical Society of CIM, pp. 183–196, 1995, no month.

Rao and Finch, "Galvanic Interaction Studies on Sulphide Minerals," Canadian Metallurgical Quarterly, vol. 27, No. 4, pp. 253–259 (1988), no month.

METHOD FOR PROCESSING GOLD-BEARING SULFIDE ORES INVOLVING PREPARATION OF A SULFIDE CONCENTRATE

CROSS-REFERENCE TO RELATED APPLICATIONS

This application is a continuation-in-part of U.S. Pat. application Ser. No. 08/423,839 filed Apr. 18, 1995, now U.S. Pat. No. 5,653,945 the entire contents of which are incorporated herein.

FIELD OF THE INVENTION

The present invention involves a method for processing gold-bearing sulfide ores to facilitate recovery of gold from the sulfide ore. In particular, the present invention involves flotation processing of gold-bearing sulfide ores in a manner that reduces problems associated with conventional flotation to produce an ore concentrate. The present invention also involves the flotation processing in combination with oxidative treating, such as pressure oxidation, and use of by-product gas from an oxygen plant used to supply oxygen gas for the oxidative treating.

BACKGROUND OF THE INVENTION

Significant amounts of gold are found in sulfide ores, in which the gold is associated with sulfide mineralogy. The gold is difficult to recover from such sulfide ores, because the gold is typically bound in sulfide mineral grains in a manner that renders the ore refractory to many traditional gold recovery techniques, such as direct cyanidation of the ore. Therefore, sulfide ores are commonly treated to chemically alter the sulfide mineral to permit dissolution of the gold during subsequent gold recovery operations.

One technique for treating a gold-bearing sulfide ore in preparation for gold recovery is to subject the ore to an oxidative treatment to oxidize sulfide sulfur in the sulfide minerals, thereby rendering the gold more susceptible to recovery. One method for oxidatively treating a sulfide ore is pressure oxidation, in which a slurry of the ore is subjected to oxygen gas in an autoclave at elevated temperature and pressure to decompose the sulfide mineral, freeing the gold for subsequent recovery. Other oxidative treating methods include roasting and bio-oxidation of the ore in the presence of air or oxygen gas.

Treating whole ores by pressure oxidation or by oxidative roasting is expensive. Part of the expense is due to energy consumed in heating gold-barren gangue material in the whole ore, and especially the energy required to heat water in which the gangue material is slurried in the case of pressure oxidation. Also, process equipment for treating a whole ore must be sized to accommodate the throughout of gangue material, in addition to the throughput of the gold-bearing sulfide minerals, thereby significantly adding to the cost of process equipment. Moreover, side reactions may occur involving gangue material which can detrimentally affect the oxidative treating or can produce hazardous materials which require special handling.

One way to reduce the high energy and process equipment costs associated with oxidative treating of a whole ore, as well as the potential for problems associated with side reactions, would be to remove gangue material from the ore prior to the oxidative treatment. For example, one method that has been used to remove gangue material from gold-bearing sulfide ores is flotation. In flotation, air is bubbled through a slurry of ore particles which have been treated with reagents and the particles of the ore which are less hydrophilic tend to attach to and rise with the air bubbles, thereby permitting separation of the ore into two fractions. Flotation has been used to prepare concentrates of gold-bearing sulfide minerals which are rich in the sulfide minerals and relatively free of gangue material. One problem with flotation of many gold-bearing sulfide ores, however, is that a significant amount of the gold-bearing sulfide mineral often reports to the wrong flotation fraction, representing a significant loss of gold.

There is a significant need for an improved method for processing many gold-bearing sulfide ores that avoids the high costs associated with oxidatively treating whole ores without the significant loss of gold associated with concentrating sulfide ores by flotation.

SUMMARY OF THE INVENTION

The present invention involves a method for processing gold-bearing sulfide ores to facilitate gold recovery without the burden of pressure oxidizing or roasting a whole ore and without the substantial loss of gold value associated with preparation of an ore concentrate by conventional flotation. It has been found that air, which is used as the flotation gas in conventional flotation, detrimentally affects flotation separation of gold-bearing sulfide minerals, and that significantly enhanced flotation performance may be obtained by maintaining the sulfide ore in an environment substantially free of air until a desired final flotation concentrate is obtained.

It is believed that oxygen gas present in air tends to oxidize the surface of certain gold-bearing sulfide mineral particles, with the effect that flotation of those sulfide mineral particles is reduced, resulting in a significant amount of sulfide mineral which fails to float during flotation, and, therefore, remains with the gangue.

By using a flotation gas that is deficient in oxygen gas relative to air, however, the problems associated with the use of air can be reduced. The result is an increased recovery of sulfide materials in the concentrate, and correspondingly, an increase in the recovery of gold in the concentrate. It is also believed that the presence of oxygen promotes increased galvanic interaction, which tends to depress sulfide minerals during flotation.

In one embodiment, the gold-bearing sulfide minerals in a sulfide ore are maintained in an environment that is substantially free of oxygen beginning with comminution of the ore and ending with recovery of a desired final sulfide mineral concentrate. An oxygen deficient gas can be introduced prior to or during comminution to displace any air that may be present in the ore feed and to prevent air from entering during comminution. Oxygen in the air that would otherwise be present during comminution is, thereby, prevented from oxidizing newly exposed sulfide mineral surfaces created during comminution. Although comminution in an atmosphere of the oxygen deficient gas is preferred, an alternative to reduce detrimental effects of oxygen is to seal the entire comminution process to prevent air from entering into the process during comminution. With this alternative, only oxygen initially in feed to comminution will be present, so that damage to the mineral material will be limited.

In addition to reducing oxygen levels during comminution and flotation, the use of an oxygen deficient gas tends to decrease galvanic interaction, with a corresponding increase in floatability of sulfide minerals. In one embodiment, galvanic interaction is further reduced by reducing the amount of iron introduced into the system and/or by removing iron from the system. Iron contamination in the system may be reduced by using comminution media made of stainless steel or hardened steel, rather than the normal mild steel, and/or by using a nonmetallic liner for comminution equipment. Iron may be removed from the system prior to flotation by magnetic separation. It has been found that reducing galvanic interaction can significantly improve recovery of gold-bearing sulfide minerals during flotation, especially when flotation is conducted with an oxygen deficient flotation gas.

Possible sources of the oxygen deficient gas include by-product gas from an oxygen plant, a dedicated nitrogen plant, combustion exhaust gases, and on-site delivery of compressed or liquified gases. In one embodiment to reduce the consumption of the oxygen deficient gas, flotation gas is recycled in the flotation operation.

When using an oxygen-deficient flotation gas according to the present invention, adjustment of other flotation operating parameters have been found to be unusually important to maximizing flotation performance. In that regard, it has been found that the flotation should be operated at an acidic pH, preferably below about pH 6. Also, use of a lead-containing activator significantly enhances flotation performance, as does the use of deoxygenated water during comminution and flotation. These additional enhancements are particularly important because it has been found that the gold is often most associated with the mineralogical/morphological sulfide species that are generally the hardest to float. Therefore, for example, a flotation enhancement that increases sulfide mineral recovery by just one percentage point may increase gold recovery in the concentrate by a proportionately larger amount. This is because the incremental sulfide mineral particles that tend to float with each enhancement include those most likely to contain significant quantities of gold. Conversely, the sulfide minerals that are easiest to float, such as coarse grain pyrite, often contain little gold.

Another embodiment according to the present invention includes a leach of flotation tails to recover gold remaining in the tail that is not associated with sulfide minerals. For some sulfide ores, this may be a significant quantity of gold. The tail leach generally involves a cyanide leach. A major advantage of the present invention is that the flotation tail is relatively clean of sulfide minerals. This is important to effective cyanide leaching of the tail because of the significant loss of cyanide that would occur if significant quantities of sulfide minerals were present in the tail.

In a still further embodiment according to the present invention, a significant operational enhancement is obtained by performing a regrind operation intermediate between two flotation stages. This permits a more coarse initial grind to be used for an initial stage of flotation to recover a significant quantity of the sulfide mineral particles. The regrind then permits additional liberation of sulfide minerals that may be locked in middling particles. Such staged processing would not be possible with conventional air flotation because of the detrimental effects of oxygen during conventional grinding and flotation.

In one aspect, the present invention involves the advantageous utilization, in the processing of gold-bearing sulfide ores, of gases which may be separated from air. In one embodiment, a flotation operation, conducted substantially in the absence of oxygen gas, is combined with oxidative treating to decompose sulfide minerals, freeing gold for possible subsequent dissolution using a gold lixiviant, such as a cyanide. The preferred oxidative treating is pressure oxidation, although another oxidative treatment such as an oxidizing roast or bio-oxidation may be used instead. Such oxidative treating often requires a source of purified oxygen gas, which is often produced by separation from air in an oxygen plant. A by-product gas from such an oxygen plant is deficient in oxygen gas and rich in nitrogen gas. The by-product gas is, therefore, an ideal source of gas for use during comminution and/or flotation of a gold-bearing sulfide ore. This by-product gas is normally vented to the atmosphere in current gold processing operations and is, therefore, wasted.

DETAILED DESCRIPTION OF THE PREFERRED EMBODIMENT

Figure 1:
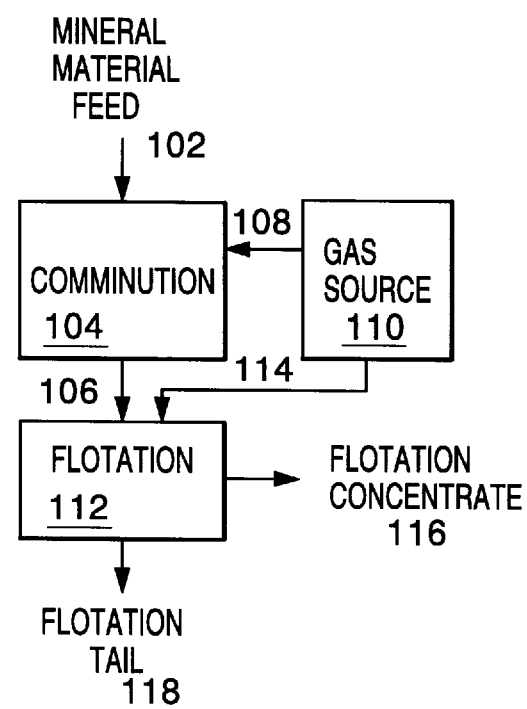
FIG. 1 is a flow diagram showing one embodiment of the present invention.

The present invention provides a method for processing a gold-bearing sulfide mineral material, such as a gold-bearing sulfide ore, to facilitate recovery of the gold from the mineral material. The method involves preparation of a flotation concentrate in a manner that reduces problems associated with conventional flotation. It has, surprisingly, been found that the problems associated with concentrating a gold-bearing sulfide ore by conventional flotation may be significantly reduced by the use of a flotation gas which comprises a lower volume fraction of oxygen gas than is present in ambient air. Preferably, the flotation gas should be substantially free of oxygen gas. When air is used as a flotation gas, the oxygen gas in the air appears to detrimentally affect the floatability of the sulfide minerals. This may be due to a surface oxidation of sulfide mineral particles caused by the presence of the oxygen gas. The surface oxidation would tend to depress the sulfide mineral particles during flotation. Furthermore, the detrimental effects of oxygen gas may be further reduced by maintaining the ore in an environment that is substantially free of oxygen gas during comminution, mixing, pumping and all other processing steps until a final flotation concentrate has been obtained. For example, when multiple flotation steps are used, it is desirable to maintain the ore in an environment that is substantially free of oxygen gas between the flotation steps.

By reducing the apparently detrimental effects of oxygen gas, it is possible to recover a greater amount of the sulfide mineral in the flotation concentrate. The present invention, therefore, facilitates the recovery of gold from sulfide mineral material which may have previously been discarded as waste, either with the gangue in a flotation tail or as subgrade ore previously believed to be uneconomical for gold recovery.

Enhanced concentration, according to the present invention, of sulfide minerals into the flotation concentrate provides a particular advantage with respect to gold recovery from gold-bearing sulfide minerals. This is because it has been found that gold in a refractory sulfide ore is often predominantly associated with sulfide mineral mineralogical/morphological species that are most difficult to effectively float. Therefore, the increase in gold recovery in the concentrate with the present invention will often be a substantially greater percentage increase than the percentage increase in recovery of sulfide minerals.

As an example of concentration of gold in difficult-to-float mineralogical/morphological species, a detailed mineralogical characterization is shown in Table 11 of auriferous pyritic species found in two refractory sulfide ore samples. One ore sample is from the Lone Tree Mine and the other ore sample is from the Twin Creeks Mine, both in Nevada, U.S.A. As shown in Table 11, the pyritic species represent a variety of mineralogical/morphological types. A common theme, however, is that the gold content of the iron sulfides generally tends to increase as the grain size and/or morphologic character becomes finer. Coarse grained pyrite contains very low levels of gold, whereas fine grained, amorphous and framboidal pyrite all contain much higher levels of gold. The pyritic species shown in Table 11 are arranged in decreasing coarseness of grain size.

TABLE 11

| Iron Sulfide Morphology | Gold Content (ppm by wt.) | | Grain Size |
|---|---|---|---|
| | Lone Tree | Twin Creeks | |
| Coarse Grained Pyrite | 2 | 2 | Coarse |
| Blastic Pyrite | 25 | NA[1] | Coarse |
| Medium Grained Pyrite | 48 | 9 | Medium |
| Fine Grained/Framboidal Pyrite | 103 | 58 | Fine |
| Amorphous/Framboidal Pyrite | NA[1] | 96 | Fine to very fine |
| Framboidal Pyrite | 190[2] | 271 | Very fine |
| Marcasite | 34 | 16 | NA |
| Orpiment | NA | 28 | NA |

[1]Not applicable.
[2]Average content from 5 high grade samples from fine grained/amorphous material.

Finer grain size and finer morphological character of a sulfide mineral renders the sulfide mineral generally more susceptible to the detrimental effects from the presence of oxygen in a flotation system. To obtain a high recovery of gold in a flotation concentrate it is, therefore, extremely important that the flotation be operated in a manner to maximize the flotation of those mineralogical morphologies that are most difficult to float. To illustrate this problem, calculated gold losses are shown in Table 12 in flotation tailings for each one percent equivalent loss of sulfide mineral to the tail for the various species. As seen in Table 12, if one percent of the iron sulfide of the Lone Tree ore is lost to the tail, and that one percent is framboidal pyrite, then the corresponding loss of gold to the tail is over three percent, or a loss of gold that is proportionately more than three times the loss of iron sulfide material. As seen for Twin Creeks, the loss of framboidal pyrite results in a loss of gold that is proportionately more than ten times the loss of the iron sulfide. To further illustrate, experience on the Lone Tree, Twin Creeks and other ores indicates gold recoveries in only the 50 to 80 percent range with conventional flotation recoveries of sulfide minerals in the 75 to 95 percent range. For the Twin Creeks ore, 87 to 90 percent flotation gold recovery in the concentrate is not achieved until sulfide sulfur recovery exceeds about 97 percent. By promoting the flotation of the most difficult-to-float mineralogical/morphological species of the sulfide minerals, the present invention addresses the need for extremely high sulfide mineral recoveries in the flotation concentrate to obtain acceptable gold recoveries.

TABLE 12

| Iron Sulfide Morphology | Gold Loss (%) per 1.0% Loss Iron Sulfide | |
|---|---|---|
| | Lone Tree | Twin Creeks |
| Coarse Grained Pyrite | 0.03 | 0.08 |

TABLE 12-continued

| Iron Sulfide Morphology | Gold Loss (%) per 1.0% Loss Iron Sulfide | |
|---|---|---|
| | Lone Tree | Twin Creeks |
| Blastic Pyrite | 0.41 | NA[1] |
| Medium Grained Pyrite | 0.80 | 0.36 |
| Fine Grained/Amorphous Pyrite | 1.71 | 2.29 |
| Amorphous/Framboidal Pyrite | NA[1] | 3.79 |
| Framboidal Pyrite | 3.15[2] | 10.7 |
| Marcasite | 0.45 | 0.63 |
| Orpiment | NA | 1.11 |

[1]Not applicable.
[2]Average content from 5 high grade samples from fine grained/amorphous material One embodiment in accordance with the present invention is shown in FIG. 1. With reference to FIG. 1, a gold-bearing mineral material feed 102 is provided for processing. The mineral material feed 102 may be any gold-bearing material comprising one or more sulfide mineral with which the gold is predominantly associated, and from which the gold is difficult to recover. The sulfide mineral could include one or more mineralogy including pyrite, marcasite, arsenopyrite, arsenous pyrite and pyrrhotite. The mineral material feed 102 is typically a whole ore, but may be a residue from other processing or a previously discarded tail.

The mineral material feed 102 is subjected to comminution 104 to obtain a particulate mineral material 106 having mineral particles of a size suitable for flotation. The particulate mineral material 106 is preferably sized such that at least 80 weight percent of particles in the particulate mineral material are smaller than about 100 mesh, more preferably smaller than about 150 mesh, and still more preferably smaller than about 200 mesh. The size at which 80 weight percent of a material passes is often referred to as a P80 size. Any suitable grinding and/or milling operation may be used for the comminution 104. Wet grinding and/or milling operations are generally preferred due to their relative ease and low cost compared to dry operations.

The comminution 104 is conducted in the presence of a blanketing gas 108 which is obtained from a gas source 110. During, or prior to, the comminution 104, the mineral material feed 102 is mixed with the blanketing gas 108, which contains oxygen gas, if at all, at a lower volume fraction of oxygen gas than is present in ambient air, to reduce problems that could be caused by the presence of air during the comminution 104. During the comminution 104, it is preferable to maintain a positive pressure of the blanketing gas 108 into any grinding and/or milling apparatus to assist mixing of the mineral material feed 102 with the blanketing gas 108, and to displace any air which may have been present with the mineral material feed 102.

After the comminution 104, the particulate mineral material 106 is subjected to flotation 112 to separate sulfide minerals, with which the gold is associated, from non-sulfide gangue material. During flotation, a slurry of the particulate mineral material 106 is aerated with a flotation gas 114 from the gas source 110. Any suitable flotation apparatus may be used for the flotation 112, such as a one or more of a conventional flotation cell or a flotation column. Preferably, however, the flotation apparatus is such that a small positive pressure of the flotation gas 114 may be maintained in the apparatus to prevent the entry of air into the apparatus. The flotation gas 114 has oxygen gas, if at all, at a reduced volume fraction relative to the volume fraction of oxygen gas in ambient air, to reduce the problems associated with using air as a flotation gas. Although not required, the flotation gas 114 will normally be of substantially the same composition as the blanketing gas 108 used in the comminution 104. Additionally, normal reagents may be added during or prior to the flotation 112 to assist in flotation separation. Such reagents may include frothing agents, activators, collectors, depressants, modifiers and dispersants. Preferably, the flotation 112 is conducted at ambient temperature and a natural pH produced by the mineral material. Operating conditions such as pH may, however, be adjusted as desired to optimize flotation separation for any particular mineral material.

Exiting from the flotation 112 is a flotation concentrate 116, which is recovered from the flotation froth and which is enriched in sulfide minerals, and consequently is also enriched in gold. Also exiting from the flotation 112 is a flotation tail 118, which is enriched in non-sulfide gangue materials, and consequently contains low levels of gold. The flotation concentrate 116 may be further processed to recover the gold by any suitable technique, if desired. Alternatively, the flotation concentrate 116 may be sold as a valuable commodity for processing by others to recover the gold.

As noted previously, the flotation gas 114 and the blanketing gas 108 each comprise oxygen gas, if at all, at a volume fraction that is less than the volume fraction of oxygen gas in ambient air. Preferably, however, the amount of oxygen gas in the flotation gas 114 and/or blanketing gas 108 is less than about 15 volume percent, and more preferably less than about 5 volume percent. Most preferably, both the flotation gas 114 and the blanketing gas 108 are substantially free of oxygen gas.

To aid in the understanding of the present invention, but not to be bound by theory, it is believed that oxygen gas, if present in any appreciable quantity, tends to oxidize the surface of particles of certain gold-bearing sulfide minerals, which can have the effect of depressing flotation of the gold-bearing sulfide mineral particles during the flotation 112. By reducing the amount of oxygen gas that comes into contact with a mineral material, it is believed that any surface oxidation effect is reduced, resulting in enhanced flotation of sulfide mineral particles and a corresponding increase in the amount of sulfide mineral, and therefore gold, recovered in the flotation concentrate 116. Therefore, it is preferred that the flotation gas 114 and the blanketing gas 108 consist essentially of components which could not oxidize the surface of gold-bearing sulfide mineral particles.

It is preferred that the flotation gas 114 and the blanketing gas 108 predominantly comprise one or more gases other than oxygen gas. Suitable gases include nitrogen, helium, argon and carbon dioxide. Preferably, one or more of these gases should comprise greater than about 95 volume percent of the flotation gas 114 and the blanketing gas 108, and more preferably greater than about 98 volume percent. Still more preferable is for the blanketing gas 108 and the flotation gas 114 to consist essentially of one or more of these gases. Nitrogen gas is particularly preferred because of its relatively low cost. Carbon dioxide is less preferred because it forms an acid when dissolved in water, which could corrode process equipment or produce conditions less conducive to optimum flotation.

The blanketing gas 108 and/or the flotation gas 114 may be introduced into process apparatus in any appropriate manner. Such gases may be fed under positive pressure or may be induced into the apparatus by creating a suction which pulls the gas in. Preferably, however, the apparatus is designed to substantially prevent introduction of air into comminution and flotation apparatus.

In one embodiment, the possible detrimental effects of any surface oxidation of sulfide mineral particles that may be present in a mineral material feed may be counteracted by the addition of a sulfidizing agent, to at least partially replace the oxidized coating with a sulfide coating. Any material capable of reacting to form the desired sulfide coating of the mineral particle could be used. Suitable sulfidizing agents include alkali metal sulfides and bisulfides, such as $Na_2S$, NaHS, etc. Such sulfidizing agents could be added just before or during any stage of the flotation 112.

With the present invention, greater than about 80 weight percent of sulfide minerals from the particulate mineral material 106 may be recovered in the flotation concentrate 116, and preferably greater than about 90 weight percent of those sulfide minerals are recovered in the flotation concentrate 116.

One major advantage of the process of the present invention is that, in addition to permitting a high recovery of gold-bearing sulfide minerals in the flotation concentrate 116, it permits a high rejection of gangue material into the flotation tail 118. Relative to the use of air as a flotation gas, the present invention permits the same recovery of gold to be obtained in a concentrate of smaller weight. This provides a significant economic advantage because less gangue material is present in the concentrate, from which the gold must ultimately be separated to produce a purified gold product, if desired.

The gas source 110 may be any source providing a suitable flotation gas 114 and blanketing gas 108. One preferred gas source 110 is a facility in which nitrogen gas is separated from air, with the separated nitrogen gas being used as the blanketing gas 108 and the flotation gas 114. Several processes are known for separating nitrogen from air, including cryogenic separation and membrane separation.

One particularly preferred gas source 110 is an oxygen plant, which is commonly found at existing facilities where gold-bearing sulfide ores are processed. An oxygen plant is typically required, for example, when a pressure oxidation operation or an oxidative roasting operation is used in the processing of gold-bearing sulfide ores. In the oxygen plant, oxygen is separated from air, such as by cryogenic separation or membrane separation, and the separated oxygen gas is used in the pressure oxidation or oxidative roasting operation. A by-product of such an oxygen plant is an effluent gas stream which is enriched in nitrogen gas and is suitable for use as the blanketing gas 108 and/or the flotation gas 114. This by-product stream has previously been vented to the atmosphere and has, therefore, been wasted. With the present invention, however, the by-product stream may be beneficially used to produce the flotation concentrate 116, in addition to using the oxygen gas product stream for the pressure oxidation or oxidative roasting operation.

Another possibility for the gas source 110 is a nitrogen plant dedicated to producing a nitrogen-enriched gas for use as the blanketing gas 108 and/or the flotation gas 114. A nitrogen plant differs from an oxygen plant in that the main product stream is a nitrogen-enriched gas stream and the by-product stream is an oxygen-enriched gas stream. The oxygen-enriched gas stream from a nitrogen plant, however, is normally of much lower purity in oxygen than an oxygen-enriched stream from an oxygen plant. The nitrogen plant may be based on separation of air into a nitrogen-enriched stream and an oxygen-enriched stream by membrane separation, cryogenic separation or otherwise.

Another possibility for the gas source 110 is a burner or other combustion device to produce combustion exhaust gases that are substantially depleted in oxygen. For example, the gas source 110 could be exhaust from an electrical power generator used to generate power for a mine or mineral processing facility. When using combustion exhaust gases as the blanketing gas 108 and/or the flotation gas 114, it is preferred that the fuel combusted to produce the gases be a clean-burning fuel such as natural gas, propane or another liquified petroleum gas, or an alcohol such as methanol or ethanol. Although less preferred, other fuels could be used such as coal or fuel oils, including diesel fuel.

Figure 10:
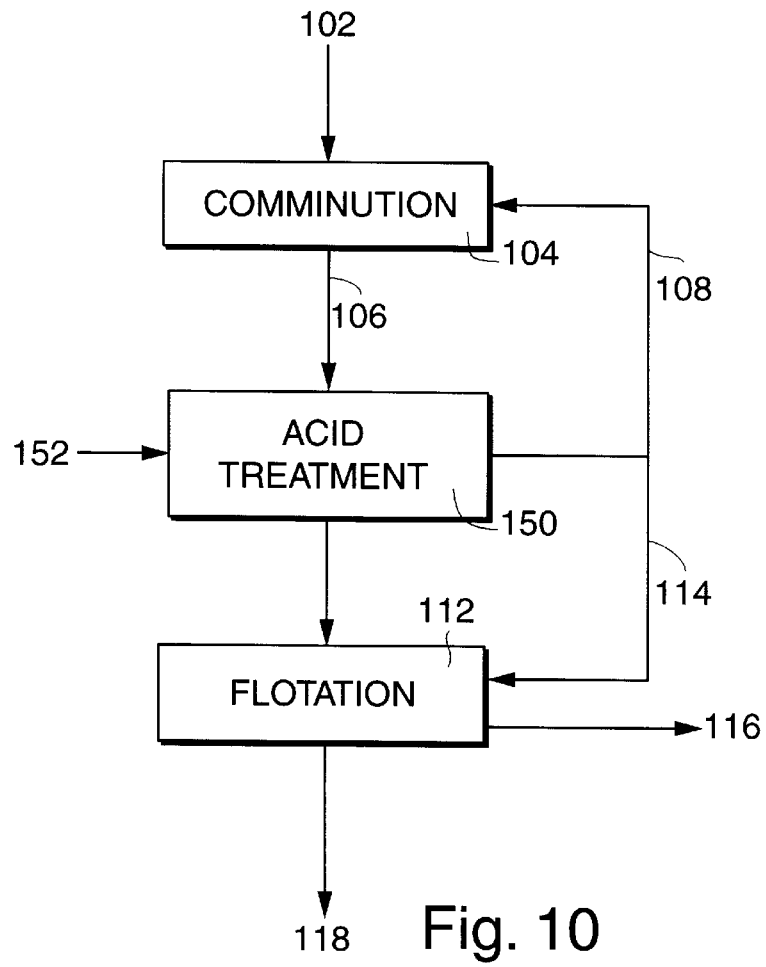
FIG. 10 is a flow diagram of one embodiment of the present invention including acid pretreatment.
Figure 28:
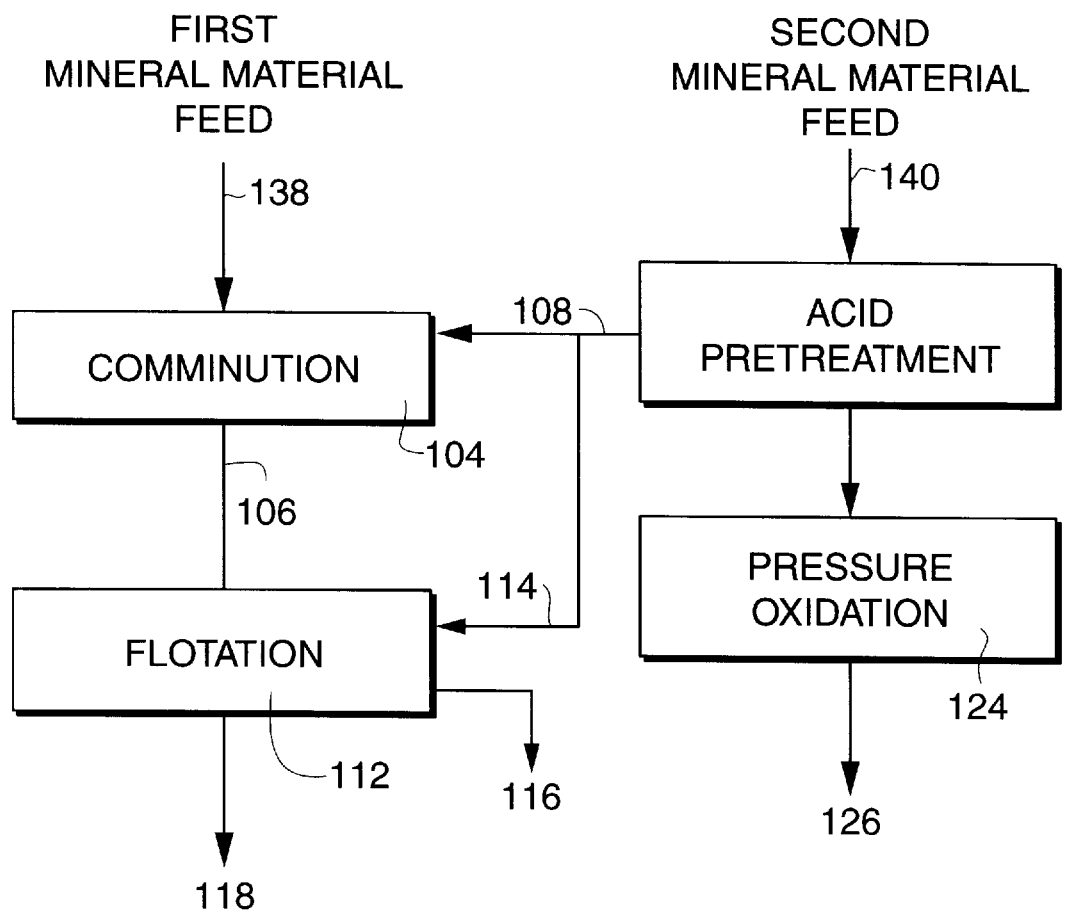
FIG. 28 is a process flow diagram of one embodiment of the present invention using gas generated in an acid pretreatment step as a flotation gas.

Yet another possibility for the gas source 110 is gas generated during acid pre-treatment of a mineral material feed 102 comprising carbonate minerals. Carbon dioxide gas is generated from decomposition of the carbonate minerals. The carbon dioxide may be used as the blanketing gas 108 and/or the flotation gas 114. Such an embodiment is shown in FIG. 10. As shown in FIG. 10, the mineral material feed 102 is subjected to comminution 104 to form the particulate mineral material 106. The particulate mineral material 106 is then subjected to an acid pre-treatment 150 where acid 152 is added to the particulate mineral material 106 to decompose carbonate minerals present in the particulate mineral material 106. The particulate mineral material 106 remaining following the acid pre-treatment is subjected to flotation 112, to form the flotation concentrate 116 and the flotation tail 118. During the acid pre-treatment 150, a gas that is enriched in carbon dioxide and deficient in oxygen is produced, which is used as the blanketing gas 108 and the flotation gas 114. An alternative to acid pretreatment of the mineral material feed 102 is to use gases produced during acid pretreatment of another carbonate-containing mineral material, such as a whole ore, prior to pressure oxidation. Such an embodiment is shown in FIG. 28.

A still further possibility for the gas source 110 is to have liquid or compressed nitrogen, carbon dioxide or another gas delivered to the site. On-site generation of the flotation gas 114 and the blanketing gas 108 is, however, preferred.

Figure 11:
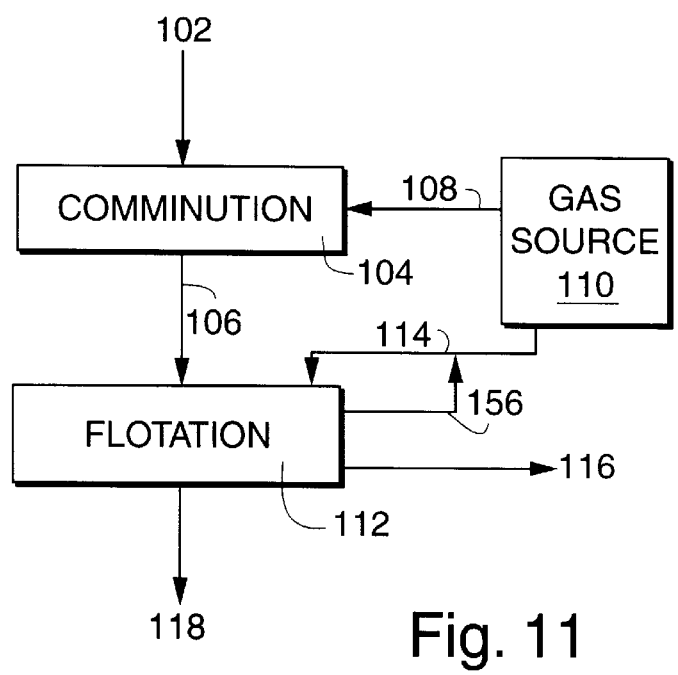
FIG. 11 is a process flow diagram of one embodiment of the present invention showing recycle of flotation gas.

In one preferred embodiment of the present invention, the flotation gas 114 is made up, at least in part, of recycled gas from the flotation 112. One such embodiment is shown in FIG. 11, where a recycle gas 156 from the flotation 112 is used as part of the flotation gas 114. In this manner, make-up flotation gas 114 from the gas source 110 may be kept to a minimum. This recycling of gas from the flotation 112 provides the benefits of reducing the amount of make-up gas that needs to be supplied by the gas source 110 and reduces emission of oxygen-deficient gas from the flotation 112. Reducing the emission of oxygen-deficient gas from the flotation 112 is particularly important when the flotation 112 is conducted in an enclosed structure where people are present, so that ambient air in the structure does not become seriously deficient in oxygen. In that regard, oxygen monitors should be placed in any such enclosed structure to ensure that sufficient oxygen is present for human needs.

Figure 12:
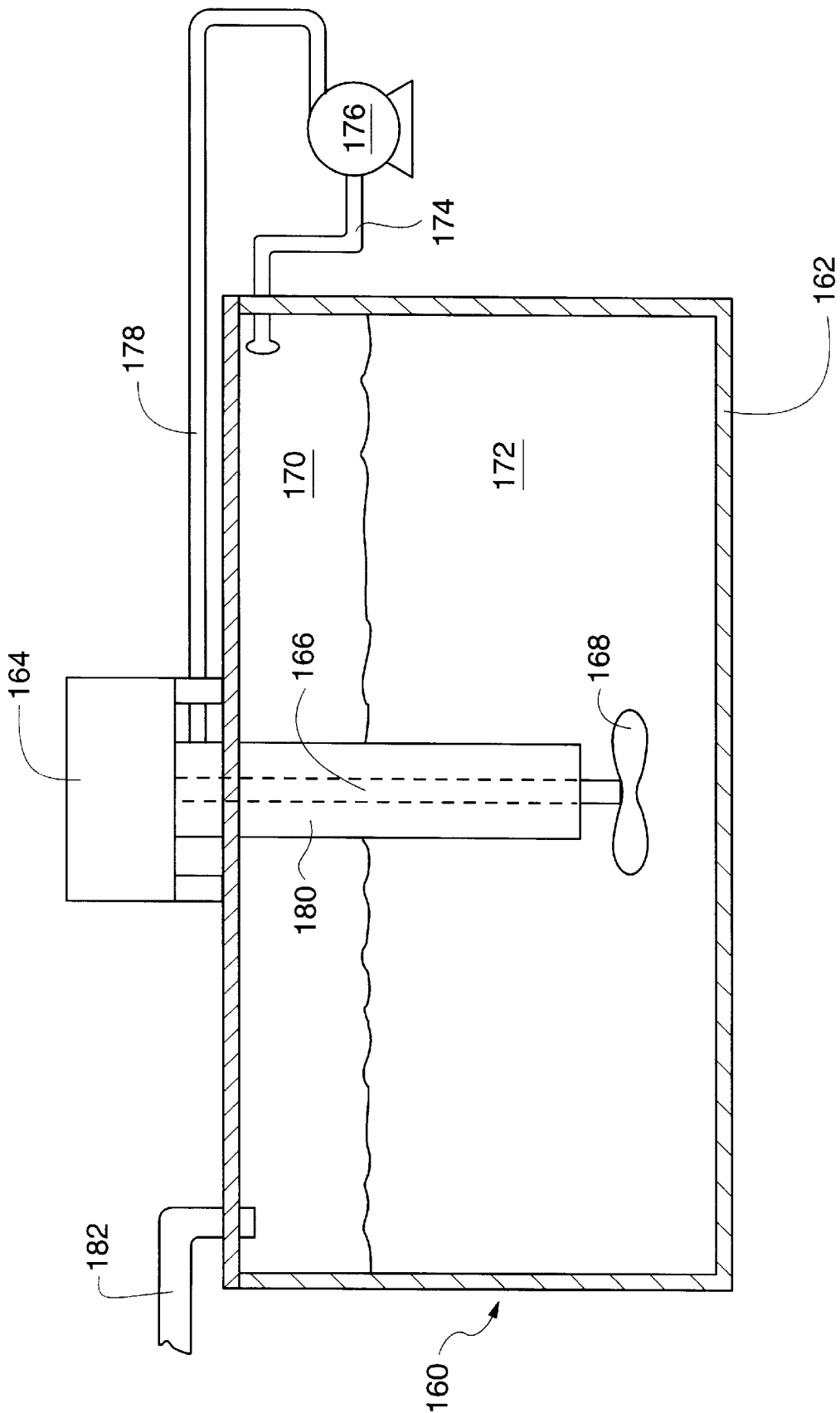
FIG. 12 is a sectional elevation showing features of one embodiment of a flotation apparatus of the present invention.

FIG. 12 shows features of one embodiment of a flotation apparatus 160 that may be used with the present invention to accomplish recycling of flotation gas. As shown in FIG. 12, the flotation apparatus 160 has a sealed flotation tank 162, above which is mounted a motor 164 for rotating a shaft 166 extending down into the flotation tank 162 to drive an impeller 168. When the flotation apparatus 160 is operating, a vapor headspace 170 exists above a liquid column 172. Gas from the vapor headspace 170 is withdrawn via a conduit 174 by a blower 176 to be forced through a conduit 178 for use as flotation gas. The flotation gas from conduit 178 is forced through an annular conduit 180 to the vicinity of the impeller 168 so that the flotation gas may be adequately distributed and dispersed throughout the liquid column 172. Make-up flotation gas is provided via conduit 182 to compensate for any system losses of flotation gas.

Figure 13:
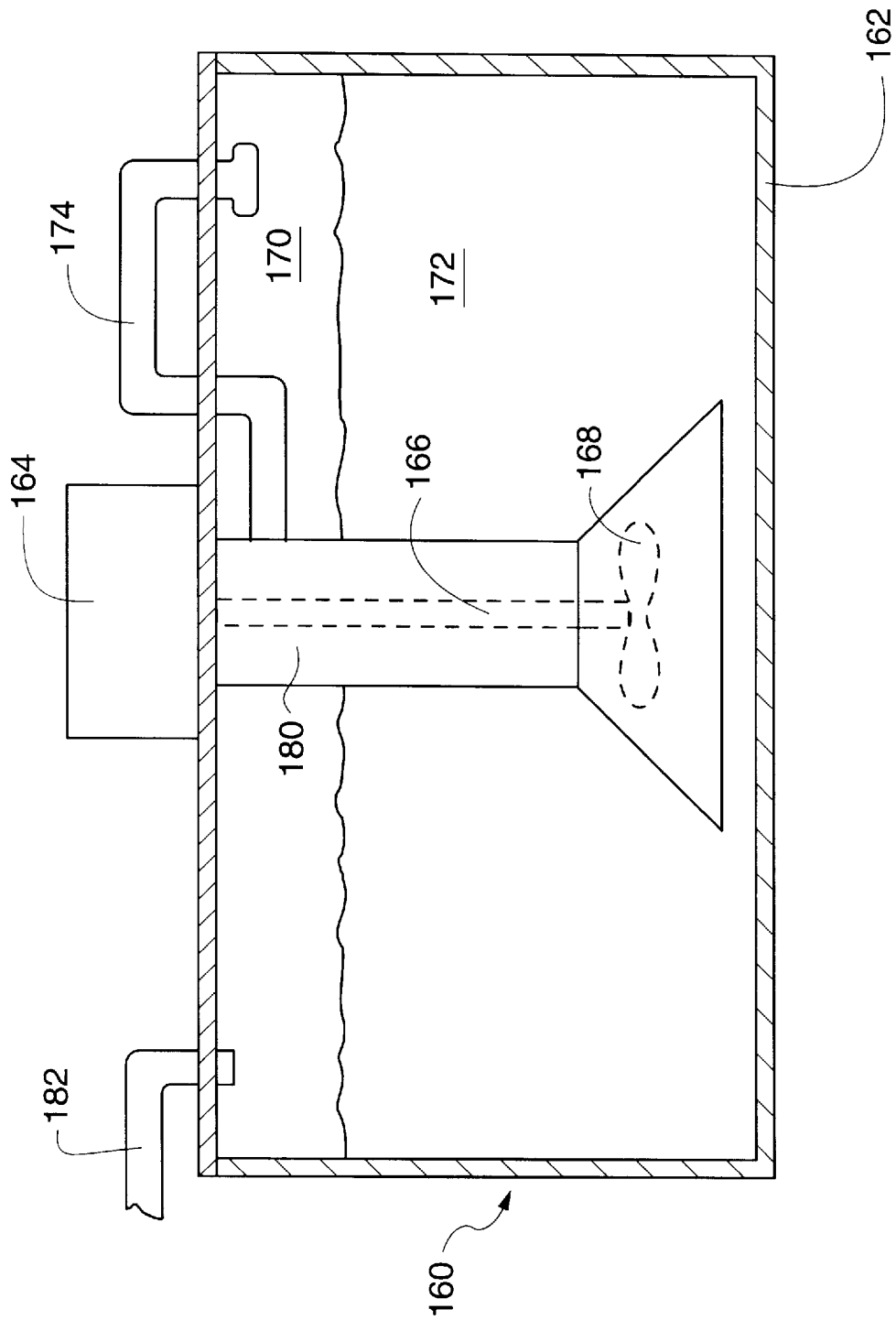
FIG. 13 is a sectional elevation of another embodiment of a flotation apparatus of the present invention.

FIG. 13 shows features of another embodiment of the flotation apparatus 160 for effecting recycle of flotation gas. In the embodiment shown in FIG. 13, the flotation apparatus 160 is designed such that a blower is not used. Instead, the conduit 174 collects gases from the overhead vapor space 170 and cycles the gas to the annular conduit 180 for use as a flotation gas. The action of the impeller 168 causes a vacuum in the annular conduit 180 creating sufficient suction to draw the flotation gas through the conduit 174 at a sufficiently high rate. This type of flotation apparatus 160 design, therefore, is self-inducing with respect to the introduction of flotation gas and does not require a blower or other gas compression device. Cycling of the flotation gas without the use of a blower is important because the recycled flotation gas will normally contain a significant amount of acid or corrosive mists or corrosive gases that could significantly corrode interior surfaces of a blower.

Referring again to FIG. 1, as noted previously, the flotation 112 may be performed at a natural pH. It has been found, however, that it is preferred that the flotation 112 be conducted at an acidic pH, and preferably at an acidic pH that is lower than about pH 6. Even more preferred is a flotation pH range of from about pH 3 to about pH 6, and most preferred is a pH range of from about pH 5 to about pH 6. Control of the pH may be accomplished by the addition of an acid or a base as necessary to adjust the pH to within the desired range. For example, sulfuric acid and/or any other acid could be added to the flotation 112 to lower the pH and lime, sodium carbonate, caustic or any other base could be added during the flotation 112 to raise the pH. Acid for reducing the pH could come from other mineral processing steps, such as pressure oxidation or bio-oxidation, as discussed below. Furthermore, acidification could be accomplished by introducing sulfur dioxide into the flotation 112. In its dissolved state in water, sulfur dioxide forms sulfurous acid. The sulfur dioxide could be provided by exhaust gas from a sulfur burner.

As noted previously, various reagents may be used during the flotation 112. It has been unexpectedly found, however, that copper-based activators generally do not perform as well as lead-based activators used during the flotation 112. Lead-based activators should contain lead in an oxidation state of +2. One preferred activator is lead nitrate. Another preferred activator is lead acetate. One benefit of using a lead-based activator, relative to the use of a copper-based activator such as copper sulfate, is that higher recoveries are experienced in the flotation concentrate 116 for both sulfide minerals and gold. Also, if the flotation tail is subjected to cyanide leaching, as discussed below, the use of a lead-based activator provides the additional advantage of lowering cyanide consumption during the leaching operation relative to a copper-based activator. An added advantage is that cyanide consumption for eventual cyanide leaching of gold contained in the flotation concentrate 116, such as after pressure oxidation, will be lower with the use of a lead-based activator compared to the use of a copper-based activator.

Another reagent that has been found to be particularly useful in the flotation 112 is a xanthate collector. The appropriate xanthate collector may be provided by addition to the flotation 112 of a xanthate salt such as potassium amyl xanthate or sodium isopropyl xanthate. The enhanced performance through use of a xanthate collector reagent is significantly greater than would normally be expected, especially when compared to the performance of other widely used collector reagents.

When the mineral material feed 102 contains a significant amount of organic carbon, the organic carbon can significantly detrimentally interfere with recovery of gold and sulfide minerals in the flotation concentrate 116. To reduce the detrimental effects of organic carbon, when present in the mineral material feed 102, it has been found to be advantageous to add an aromatic oil to the flotation 112. One example of such an aromatic oil is moly collecting oil, commonly referred to as MCO.

Figure 14:
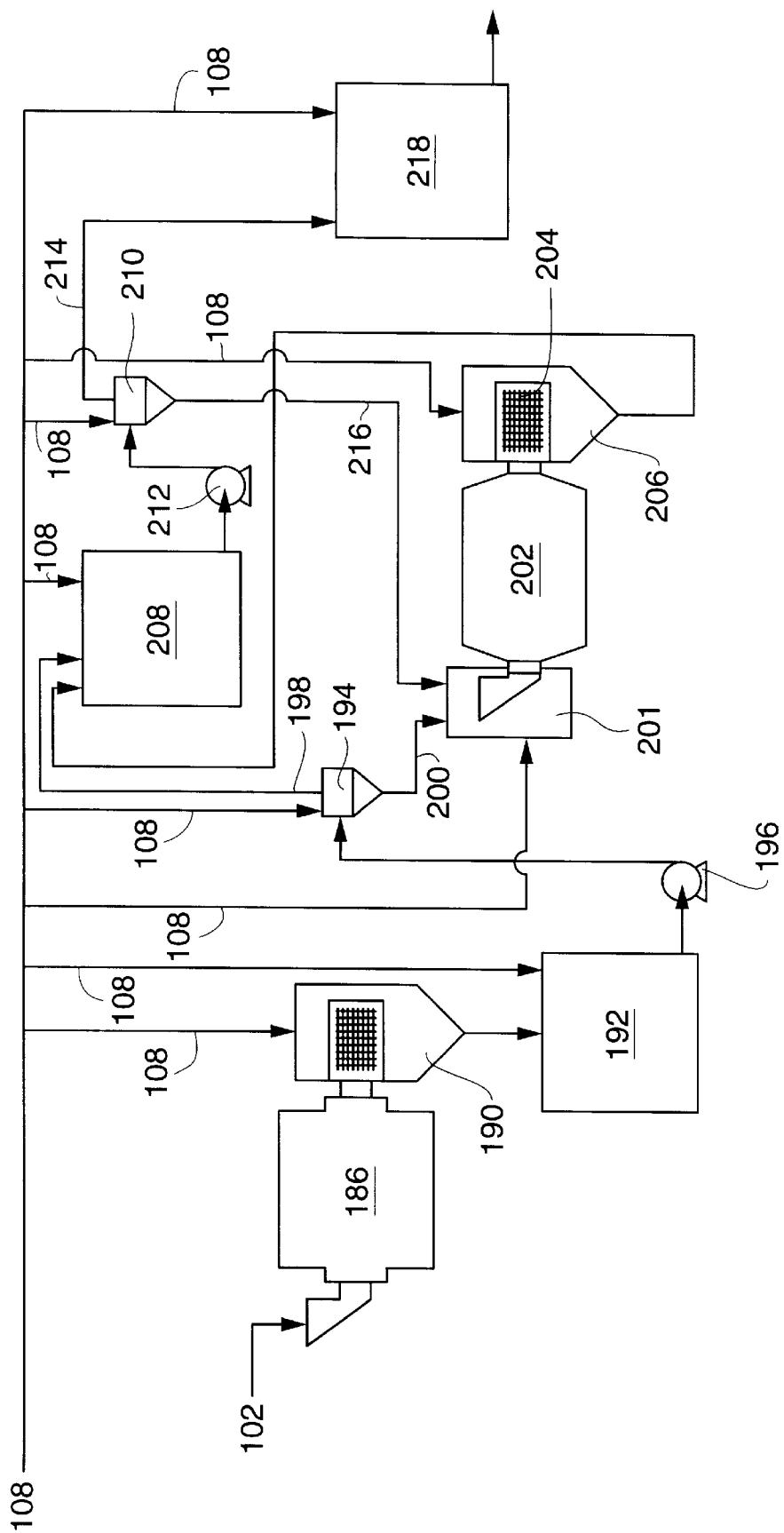
FIG. 14 is a process flow diagram of a comminution circuit of one embodiment of the present invention.

As discussed above, the comminution 104 is conducted in the presence of the blanketing gas 108. With reference now to FIG. 14, one embodiment of a comminution circuit is shown. As shown in FIG. 14, the mineral material feed 102 is fed to a first comminution unit 186, such as a sag mill. In the first comminution unit 186, the mineral material particles in the mineral material feed 102 are reduced in size. Output from the first comminution unit 186 passes through a trommel screen 188 in a sealed discharge box 190. Blanketing gas 108 is fed into the discharge box 190 so that the blanketing gas will flow back through the first comminution unit 186 in counter-flow with the mineral material feed 102, to ensure removal of air from the mineral material feed 102. Material exiting the discharge box goes to a tank 192 for delivery to a cyclone separator 194 via a pump 196. The cyclone separator 194 classifies the mineral material by particle size into an overflow 198 of smaller-size particles and an underflow 200 of larger-size particles. The underflow 200 is then fed to sealed feed box 201 of a second comminution unit 202, such as a ball mill, to further reduce the size of mineral material particles in the underflow 200. Discharge from the second comminution unit 202 passes through a trommel screen 204 in a sealed discharge box 206. Blanketing gas 108 is fed into both the feed box 201 and the discharge box 206. Material exiting the discharge box 206 goes to a tank 208 where it is combined with the overflow 198 from the cyclone separator 194. Discharge from the tank 208 goes to a cyclone separator 210 via a pump 212. The cyclone separator 210 makes a size separation of particles into an overflow 214 comprising smaller-size particles and an underflow 216 comprising larger-size particles. The underflow 216 from the cyclone separator 210 is fed to the second comminution unit 202 along with the underflow 200 from the cyclone separator 194. The overflow 214 from the cyclone separator 210 goes to the tank 218 where particulate mineral material in the overflow 214 may be held for feed to flotation processing.

It should be noted that, as shown in FIG. 14, all process equipment is sealed except for feed into the comminution unit 186. Furthermore, the blanketing gas 108 is introduced at various points in the comminution system to ensure that minimal air makes its way into the system. As shown in FIG. 14, the blanketing gas 108 is specifically fed to the discharge box 190 of the first comminution unit 186, to the tanks 192, 208 and 218; to the cyclone separators 194 and 210; and to the feed box 201 and the discharge box 206 of the second comminution unit 202.

In addition to maintaining the comminution environment in the absence of any significant quantities of air, it is important to the performance of subsequent flotation operations that the effects of galvanic interaction be reduced as much as possible during comminution of the mineral material feed 102. Such galvanic interactions are due to different electrochemical activities at different material surfaces. The combination of a cathodic surface (i.e., pyrite, pyrrhotite, etc.) and an anodic surface (i.e., iron from comminution media or from steel walls of mill liners) results in the creation of galvanic cell during the comminution processing. Galvanic cells also exist between different sulfide minerals that may be present in the mineral material feed, with the sulfide mineral with the higher rest potential acting as the cathode and the sulfide mineral with the lower rest potential acting as the anode. For example, the galvanic interaction between grinding iron and various forms of auriferous pyrite can be represented by the following reactions:

grinding iron surface (anode):

$$Fe = Fe^{+2} + 2e^- \qquad \text{Eq. 1}$$

auriferous pyrite surface (cathode):

$$\tfrac{1}{2}O_2 + H_2O + 2e^- = 2OH^- \qquad \text{Eq. 2}$$

For example, during grinding, galvanic cells are created every time an auriferous pyrite mineral surface comes into contact with grinding media, mill liners, abraded tramp iron or any other metal sulfide at a lower or higher rest potential. These galvanic interactions create hydroxide coatings on sulfide mineral surfaces, depressing their floatability. According to the present invention, such detrimental galvanic interactions can be hindered by reducing the amount of oxygen present during comminution through use of the blanketing gas 108.

It has been found, however, that, in addition to reducing the amount of oxygen present during the comminution operation, improved flotation results may be obtained by further limiting iron contamination of the mineral material being processed. The combination of reducing the amount of iron introduced into the mineral material and the use of the blanketing gas 108 provides an increase in gold recovery in the flotation concentrate that would be unexpected based on the contributions of each alone.

One way to reduce the amount of iron available for galvanic interactions during the comminution processing is to use comminution media made of a hardened steel or a corrosion-resistant steel, such as stainless steel or a high chromium alloy steel. Although ceramic comminution media could be used, ceramic comminution media are typically not of sufficient density for effective comminution.

Another way to reduce detrimental galvanic effects from iron is to provide all comminution equipment, such as grinders and mills, with non-metallic liners, and preferably with rubber liners.

Figure 15:
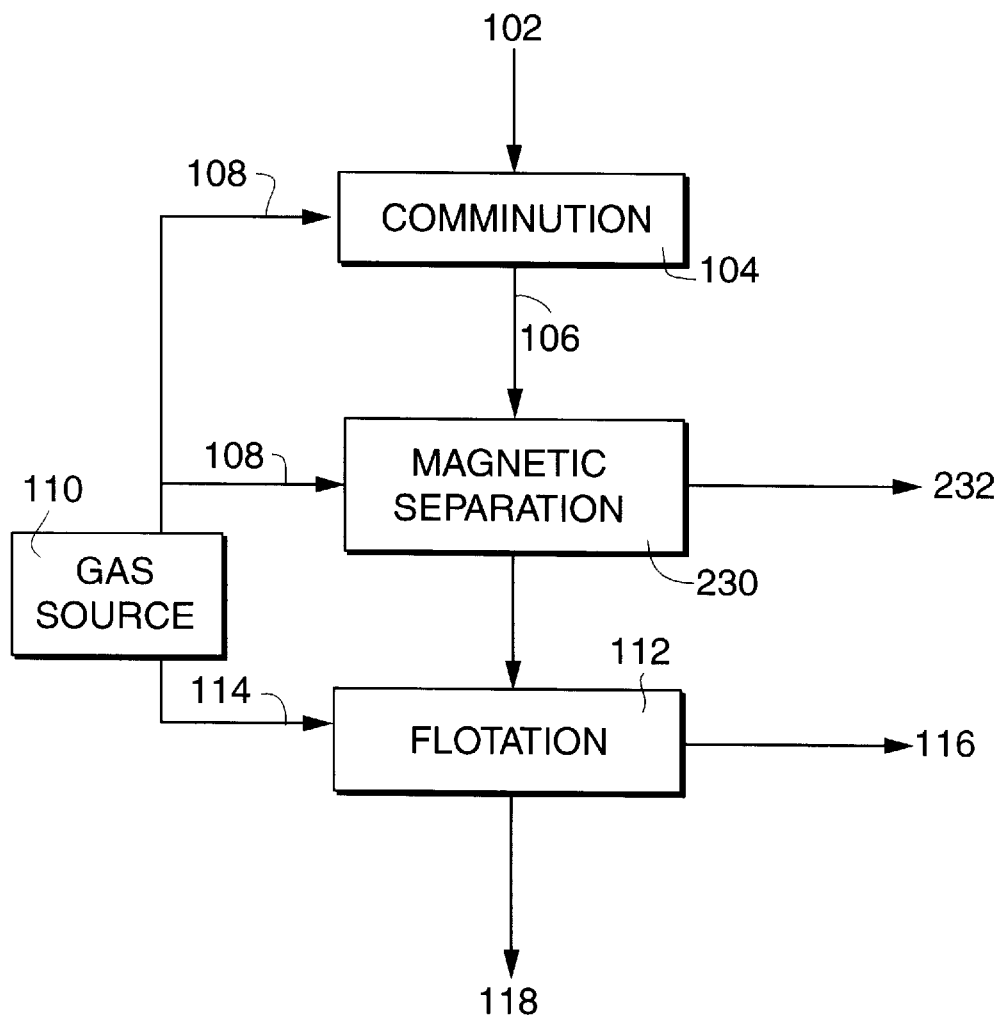
FIG. 15 is a process flow diagram of one embodiment of the present invention including magnetic separation prior to flotation.

A further, and preferred method for reducing detrimental galvanic interactions caused by iron during flotation is to perform a magnetic separation step after comminution and prior to flotation. Referring to FIG. 15, an embodiment is shown including a magnetic separation step after comminution. As shown in FIG. 15, the mineral material feed 102 is first subjected to comminution 104, followed by magnetic separation 230 to remove particles of magnetic material 232 from the mineral material 106.

As an alternative to the embodiments discussed thus far, it should be noted that many of the advantages of the present invention may be obtained even without the use of the blanketing gas 108. In that regard, most conventional comminution circuits utilize equipment that freely permits air to enter into the system. With the present invention, however, when it is not practical or economic to use a blanketing gas, enhanced performance may still be obtained by sealing all equipment involved with comminution processing so that substantially the only oxygen entering into the comminution processing enters with the mineral material feed 102 to be processed. In that regard, such a comminution system could be substantially as described with respect to FIG. 14, with all process equipment sealed to prevent the entry of air and with no blanketing gas 108 being fed to the process equipment. Oxygen already present in the mineral material feed 102 would be consumed through oxidation of surfaces of sulfide mineral particles exposed during comminution. Once all of that original oxygen had been consumed, however, the continued detrimental effects of oxygen would be substantially eliminated. Although this mode of operation is not as preferable as using the blanketing gas 108, it is preferred to a system that it is open to the introduction of air, as is commonly practiced.

To further reduce the amount of oxygen introduced in the system to reduce the detrimental effects of surface oxidation of sulfide minerals and of galvanic interactions, it is preferred that process water used to slurry mineral material for comminution processing and/or flotation processing has been deoxygenated. Deoxygenation of process water can significantly enhance recovery in the concentrate of sulfide minerals and gold during flotation processing. The deoxygenation may be performed in any convenient manner, such as by bubbling an inert stripping gas, such as nitrogen or carbon dioxide, through the process water to remove oxygen from the process water or by adding an oxygen scavenger to the water to tie-up the oxygen. It has been found that a flotation tank works well for deoxygenation, with nitrogen or carbon dioxide being introduced into the vessel to perform the oxygen stripping function. Alternatively, the inert stripping gas could be sparged into a tank containing the process water. Preferably, the process water should be deoxygenated to a dissolved oxygen level that is less than about 1.0, and more preferably less than about 0.5, parts per million of oxygen by weight.

Also, with the present invention it is possible to use recycled water as process water. When recycled water is used, however, it is important that an activator be used during flotation processing. This is because any cyanide in the recycle water that is available for reaction with sulfide sulfur or sulfide minerals will tend to depress flotation of the sulfide minerals and, accordingly, reduce the recovery of gold in the concentrate. The activators, however, counter the depressing effect that cyanide has on flotation. Also, the recycle water may be treated with a material such as ammonium bisulfite, sulfur dioxide, a peroxide, Caro's acid or any other known cyanide destruction technology used to destroy the cyanide prior to using the recycle water for flotation.

Figure 2:
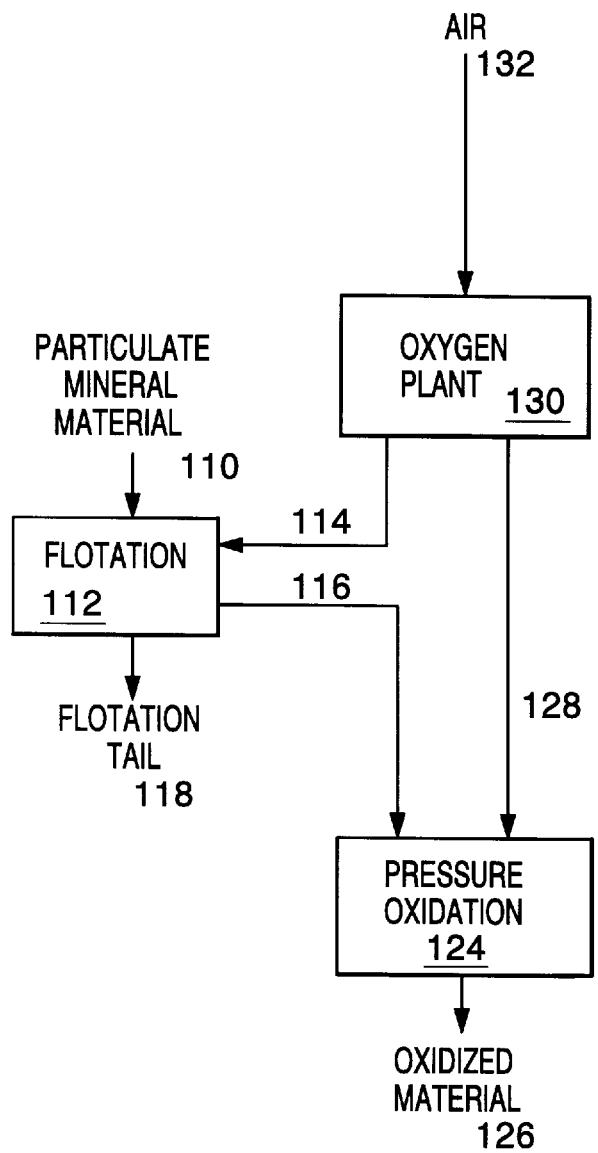
FIG. 2 is a flow diagram showing another embodiment of the present invention.

As noted with respect to FIG. 1, one preferred gas source 110 for the blanketing gas 108 and the flotation gas 114 is an oxygen plant. FIG. 2 shows one embodiment of the present invention in which both the oxygen gas product stream and the nitrogen gas by-product stream from an oxygen plant are both used to process gold-bearing sulfide mineral material. Referring to FIG. 2, particulate mineral material 110 is subjected to the flotation 112 to produce the flotation concentrate 116 and the flotation tail 118, as previously described. The flotation gas 114 is a nitrogen gas enriched by-product stream from an oxygen plant 130, in which air 132 is separated into an oxygen enriched gas stream (treating gas 128) and nitrogen enriched gas stream (flotation gas 114).

The flotation concentrate 116, which is enriched in gold-bearing sulfide minerals, is subjected to pressure oxidation 124 to decompose sulfide minerals, producing an oxidized material 126 from which the gold could be recovered by dissolution using any suitable gold lixiviant, such as a cyanide. The pressure oxidation 124 involves treating a slurry of the flotation concentrate 116 in an autoclave at a temperature of greater than about 150° C. and an elevated pressure in the presence of an overpressure of a treating gas 128, which is rich in oxygen. It should be noted that other oxidative treating steps could be used instead of the pressure oxidation 124. For example, an oxidative roasting or bio-oxidation could be used to produce the oxidized material 126 using the treating gas 128.

Figure 3:
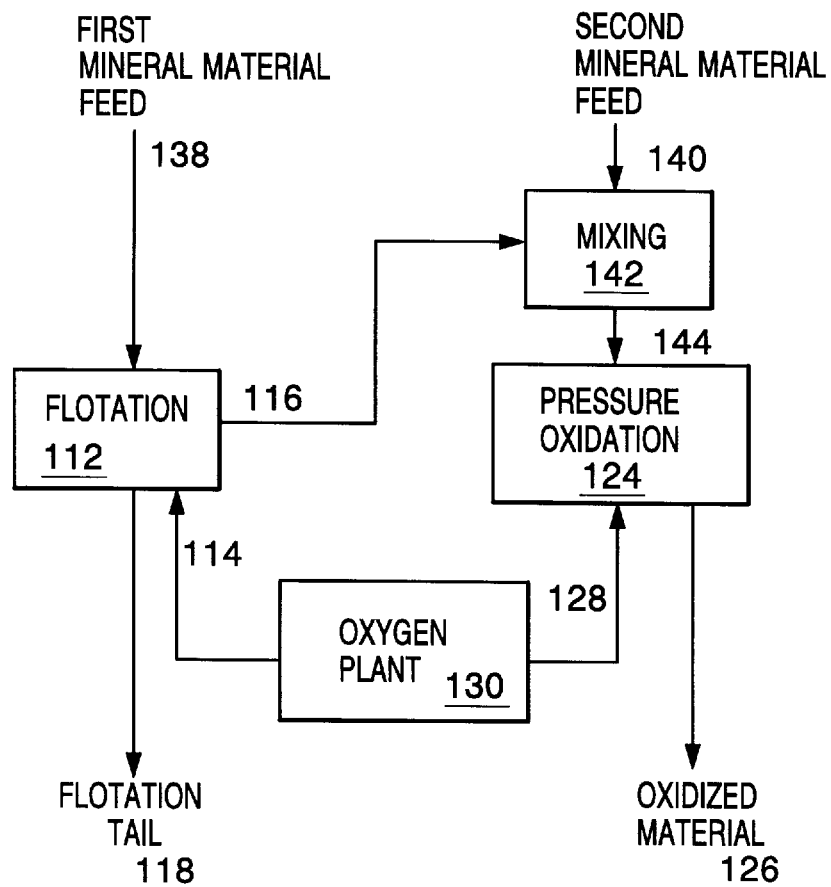
FIG. 3 is a flow diagram showing yet another embodiment of the present invention.

A further embodiment in accordance with the present invention is shown in FIG. 3 which uses the product and by-product gas streams from an oxygen plant to process a gold-bearing sulfide mineral material provided in two separate feed streams. Referring to FIG. 3, a particulate first mineral material feed 138 is subjected to the flotation 112 to produce the flotation concentrate 116 and the flotation tail 118, as previously described. The flotation gas 114 is a gas stream enriched in nitrogen from the oxygen plant 130. A particulate second mineral material feed 140 is combined with the flotation concentrate 116 in a mixing step 142. The combined stream 144, in the form of a slurry, is subjected to the pressure oxidation 124 to produce the oxidized material 126, from which gold could be recovered.

One advantage of the embodiment shown in FIG. 3 is that it permits the processing of multiple ores having different characteristics. For example, the first mineral material feed 138 may comprise a lower grade gold-bearing sulfide ore than the second mineral material feed, which may comprise a higher grade gold-bearing sulfide ore. The higher grade ore may be suitable for pressure oxidation in a whole ore form, whereas the lower grade ore must be upgraded to a concentrate form to be suitable for pressure oxidation.

Alternatively, the second mineral material feed may comprise a gold-bearing sulfide ore which has a significant amount of carbonate material which would require acid to be added prior to pressure oxidation 124, and which could, therefore, cause high operating costs compared to ores with low carbonate levels detrimentally interfere with proper operation of the pressure oxidation 124. A high sulfide sulfur content in the flotation concentrate 116, however, tends to produce additional acid during pressure oxidation to at least partially offset the acid consuming effect of carbonate material in the second mineral material feed. Most of the carbonate material that may have been present in the first mineral material feed, if any, would ordinarily have been removed during the flotation 112.

With the present invention, most of the gold reports to the flotation concentrate. Gold in the concentrate, which is typically substantially all associated with one or more sulfide mineral, may then be freed for recovery operations by oxidative processing, such as pressure oxidation, oxidative roasting or bio-oxidation. Many mineral material feeds, however, contain a significant amount of gold that is not associated with a sulfide mineral. For example, it is not uncommon for a gold-bearing refractory sulfide ore to also contain some gold in association with oxidized minerals. Up to 50%, and in some instances even more, of the gold in a refractory sulfide ore may be associated with minerals other than sulfide minerals. Also, refractory sulfide ores that have been stockpiled for a significant amount of time, and therefore exposed to air for a significant amount of time, may contain even larger amounts of gold that are no longer held by the sulfide minerals. This is because a significant amount of a sulfide mineral may become oxidized so that a significant quantity of the gold is no longer associated with the sulfide mineral. For example, a refractory sulfide ore stockpiled for several months may oxidize to a degree where 20% to 30% or more of the gold is no longer associated with sulfide minerals.

It has been found that the present invention works very well for the treatment of mineral material feeds having both gold associated with sulfide minerals and gold not associated with sulfide minerals. Gold that is not associated with sulfide minerals, and especially gold associated with oxidized minerals, may be recovered following flotation processing by leaching of the flotation tail. Although any compatible leaching operation may be used, a preferred leaching operation is cyanide leaching. One embodiment of the present invention involving a leach of the flotation tail is shown in FIG. 16.

Figure 16:
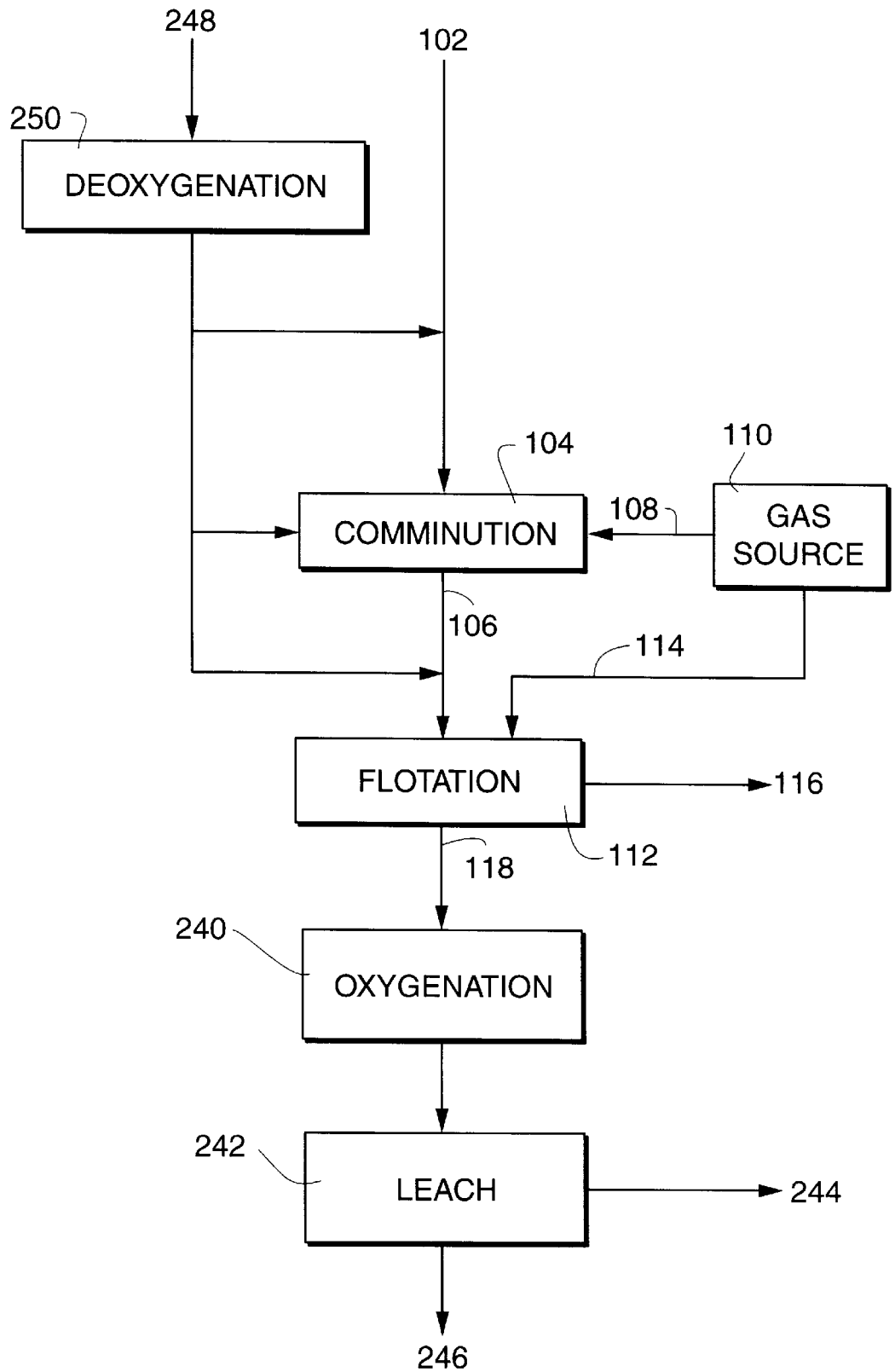
FIG. 16 is a process diagram of one embodiment of the present invention including a leach of flotation tails and including the use of deoxygenated water.

With reference to FIG. 16, a mineral material feed 102 is provided having both gold that is associated with a sulfide mineral and gold that is not associated with a sulfide mineral. The mineral material feed 102 is subjected to comminution 104 to prepare the particulate mineral material 106, which is then subjected to flotation 112. Following the flotation 112, the flotation tail 114 is subjected to oxygenation 240 followed by a leach 242 of the flotation tail 114. Preferred for the leach 242 is a carbon-in-pulp cyanide leach, although a carbon-in-leach cyanide leach could be used instead. Exiting from the leach 242 is loaded carbon 244 that is loaded with gold. Also exiting from the leach 242 is a leach tail 246 that is depleted in gold. The loaded carbon 244 may be processed in any known manner for recovery of the gold.

With continued reference to FIG. 16, the comminution 104 and the flotation 112 are performed in the presence of the blanketing gas 108 and the flotation gas 114, respectively, supplied from the gas source 110. As also shown in FIG. 16 process water 248 is subjected to deoxygenated prior to using the process water 248 in the process. Therefore, according to the embodiment shown in FIG. 16, the process water 248 is first deoxygenated in the deoxygenation step 250 and, following the flotation 112, the water with the flotation tail 118 is then oxygenated in the oxygenation step 240 prior to the leach 246. The oxygenation 240 may be accomplished in any manner suitable for increasing the amount of oxygen dissolved in the liquid of the slurry of the flotation tail 118. Typically, the slurry of the flotation tail 118 is subjected to sparging or bubbling with air or an oxygen-enriched gas. Oxygenation 240 may be conducted using air or an oxygen-enriched gas, such as would be suitable for pressure oxidation processing, as previously discussed. Although the embodiment described with respect to FIG. 16 includes deoxygenation of process water, such deoxygenation is not required. The use of deoxygenated process water does, however, tend to improve gold recovery from the process.

The ability to successfully leach the flotation tail 118, as shown in FIG. 16, results from the efficient separation of sulfide minerals into the concentrate during the flotation 112. If a significant amount of sulfide mineral were to report to the flotation tail 118, then performance of the leach 242 could be significantly impaired because sulfide sulfur from the sulfide mineral would consume cyanide during a cyanide leach and the gold in the flotation tail associated with the sulfide mineral would not be leachable. With the present invention, however, cyanide consumption is reduced during the leach 242 because of the efficient reporting of sulfide minerals to the flotation concentrate 116 and the relative absence of sulfide minerals in the flotation tail 118.

Another significant advantage of the process of the present invention is that it permits interim regrinding of particulate mineral material between flotation stages (to enhance gold recovery in the concentrate). Such intermediate grinding can significantly enhance recovery of gold in sulfide minerals fragments locked in middling particles. By comparison, with conventional flotation using air as the flotation gas, such intermediate grinding would further reduce the floatability of the particulate mineral material due to the detrimental effects of oxygen.

Figure 17:
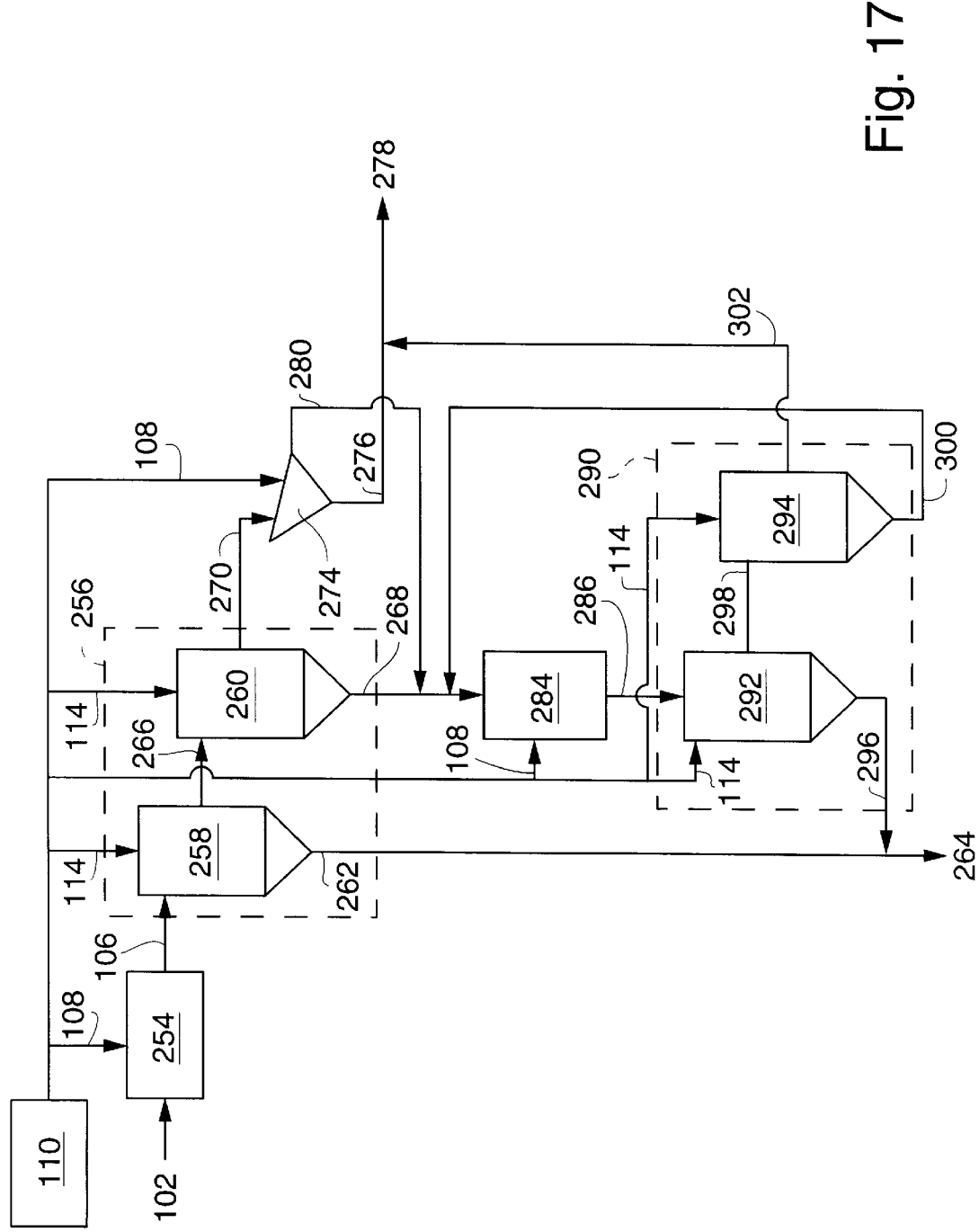
FIG. 17 is a process flow diagram of one method of the present invention having multiple flotation stages with comminution occurring between flotation stages.

FIG. 17 shows a process diagram for one embodiment according to the present invention involving regrinding of particulate mineral material intermediate between flotation stages. As shown in FIG. 17, a mineral material feed 102 is subjected to a first comminution step 254 to produce a particulate mineral material 106, which is then subjected to a first flotation stage 256. The first flotation stage 256 includes rougher flotation 258 and rougher scavenger flotation 260. In the rougher flotation 258, the particulate mineral material 106 is separated by flotation into a rougher concentrate 262, which forms part of a final concentrate 264, and a rougher tail 266, that is fed to the rougher scavenger flotation 260. The rougher scavenger flotation produces a rougher scavenger concentrate 268 and a rougher scavenger tail 270. The rougher tail 266, the rougher scavenger concentrate 268 and the rougher scavenger tail 270 often include a substantial amount of middling particles. Such middling particles include gold-bearing sulfide mineral fragments locked with gangue material, such as silica. Additionally, the rougher scavenger tail 270 will typically include a substantial amount of very fine slime particles.

To remove the slime particles and to permit recovery of the sulfide mineral fragments from middling particles, the rougher scavenger tail 270 is subjected to a size separation 274, such as may be accomplished using a screen or a classifying cyclone. A first fraction 276, comprising the smaller-size slime particles becomes part of a final tail 278. For example, a 500 mesh screen may be used in the size separation 274 with all particles passing through the screen being sent to the final tail 278 as slimes.

A second fraction 280 from the size separation 274, which comprises larger-size particles, is sent to a second comminution step 284 along with the rougher scavenger concentrate 268. In the second comminution step 284, particles are comminuted to a smaller size to break up middling particles and liberate gold-bearing sulfide mineral fragments. The reground mineral material 286 is sent to a second flotation stage 290 for concentration of the sulfide mineral fragments liberated from middling particles. The second flotation stage 290 includes cleaner flotation 292 and cleaner scavenger flotation 294. In the cleaner flotation 292, a cleaner concentrate 296 is produced, which is sent to form part of the final concentrate 264. The cleaner flotation 292 also produces a cleaner tail 298 which is sent to the cleaner scavenger flotation 294. In the cleaner scavenger flotation 294, a cleaner scavenger concentrate 300 is prepared, which is recycled to the second comminution step 284 for further processing. The cleaner scavenger flotation 294 also produces a cleaner scavenger tail 302 that is sent to form part of the final tail 278.

Also shown in FIG. 17 is the gas source 110 that supplies blanketing gas 108 to the first comminution step 254, the second comminution step 284 and the size separation 274. The gas source 110 also provides flotation gas 114 to the rougher flotation 258, the rougher scavenger flotation 260, the cleaner flotation 292 and the cleaner scavenger flotation 294. Use of the blanketing gas 108 and the flotation gas 114 substantially prevents problems that could occur if comminution and/or flotation operations were conducted in the presence of air. Furthermore, because the detrimental effects from air are reduced, it is possible to have the second comminution step 284 intermediate between the first flotation stage 256 and the second flotation stage 290 without destroying the floatability of sulfide minerals in the reground mineral material 286. The second comminution step 284 significantly improves performance of the flotation circuit. This is because it will not be necessary to comminute all of the mineral material feed 102 to a very fine size that may be required for liberating gold-bearing sulfide minerals from middling particles in the first comminution step 254. Having a coarser grind for the particulate mineral material 106 is significantly less expensive than comminuting all of the mineral material feed 102 to a size small enough to liberate gold-bearing sulfide mineral fragments from middling. Also, a coarser comminution to produce the particulate mineral material 106 simplifies operation of the first flotation stage. Middling particles from the first flotation stage 256 are, then further comminuted in the second comminution step 284 to liberate the locked gold-bearing sulfide mineral fragments for recovery in the second flotation stage 290.

The present invention is further described by the following examples, which are intended to be illustrative only and are not intended to limit the scope of the present invention.

EXAMPLES

Examples 1–6

Examples 1–6 demonstrate the use of nitrogen gas as a flotation gas during flotation of a gold-bearing sulfide ore to produce a sulfide enriched concentrate which could be further processed to recover gold, if desired.

For each of Examples 1–6, an ore sample is provided from Santa Fe Pacific Gold Corporation's Lone Tree Mine in Nevada. The ore samples are of a low grade sulfide ore which would be unsuitable for economic pressure oxidation in a whole ore form. A representative assay of an ore sample is shown in Table 1.

TABLE 1

| LONE TREE SUBGRADE SULFIDE ORE REPRESENTATIVE HEAD ANALYSIS | |
|---|---|
| Gold | 0.063 oz/st[1] |
| Silver | 0.05 oz/st[1] |
| Total Sulfur | 1.75 wt. % |
| Sulfide Sulfur | 1.66 wt. % |
| Arsenic | 1440 ppm. by wt. |

[1]ounces per short ton of ore

For each example, the ore sample is ground to the desired size. A first portion of the ore sample is subjected to flotation in a laboratory-scale flotation cell using air as the flotation gas. A second portion of the ore sample is subjected to flotation under the same conditions, except using a flotation gas which consists essentially of nitrogen gas. During each flotation test, a flotation froth is collected from the top of the flotation cell to recover a flotation concentrate which is enriched in sulfide minerals, and which is, therefore, also enriched in gold. The flotation tail is that material which is not collected in the froth. For each flotation test, the flotation conditions are substantially as follows: A natural pH and addition of potassium amyl xanthate and mercaptobenzothiazole as collectors, copper sulfate for activation of sulfides and MIBC as a frother. Flotation times range from 20 to 30 minutes.

The results for examples 1–6 are shown tabularly in Table 2 and graphically in FIGS. 4–7 and reveal a significant increase in the amount of gold recovered in the concentrate when nitrogen gas is used as the flotation gas, especially at smaller grind sizes.

used as a flotation gas, with the detrimental chemical process counteracting the normally beneficial effects of a smaller grind size. It was observed that when air is used as the flotation gas, the pH of the slurry in the flotation cell drops rapidly for several minutes, sometimes falling by as much as 0.5–2 pH units. Therefore, it appears that oxygen in the air may be oxidizing the surface of sulfide mineral particles, producing sulfuric acid and lowering the slurry pH. Such surface oxidization of the sulfide mineral particles could

TABLE 2

LONE TREE SUBGRADE BATCH TESTS

| Example | Grind P80 Mesh[1] | Concentrate Grade oz gold/st[2] | | Tail Grade oz gold/st[3] | | Concentrate Recovery wt. %[4] | | Gold Reporting to Concentrate %[5] | |
| --- | --- | --- | --- | --- | --- | --- | --- | --- | --- |
| | | air | nitrogen | air | nitrogen | air | nitrogen | air | nitrogen |
| 1 | 100 | 0.31 | 0.35 | 0.019 | 0.020 | 15 | 15 | 75 | 75 |
| 2 | 150 | 0.28 | 0.31 | 0.021 | 0.016 | 15 | 16 | 71 | 79 |
| 3 | 200 | 0.33 | 0.29 | 0.021 | 0.016 | 15 | 19 | 74 | 81 |
| 4 | 270 | 0.22 | 0.25 | 0.022 | 0.012 | 20 | 24 | 72 | 86 |
| 5 | 325 | 0.23 | 0.20 | 0.022 | 0.016 | 20 | 25 | 73 | 81 |
| 6 | 400 | 0.14 | 0.14 | 0.029 | 0.012 | 29 | 33 | 67 | 85 |

Figure 4:
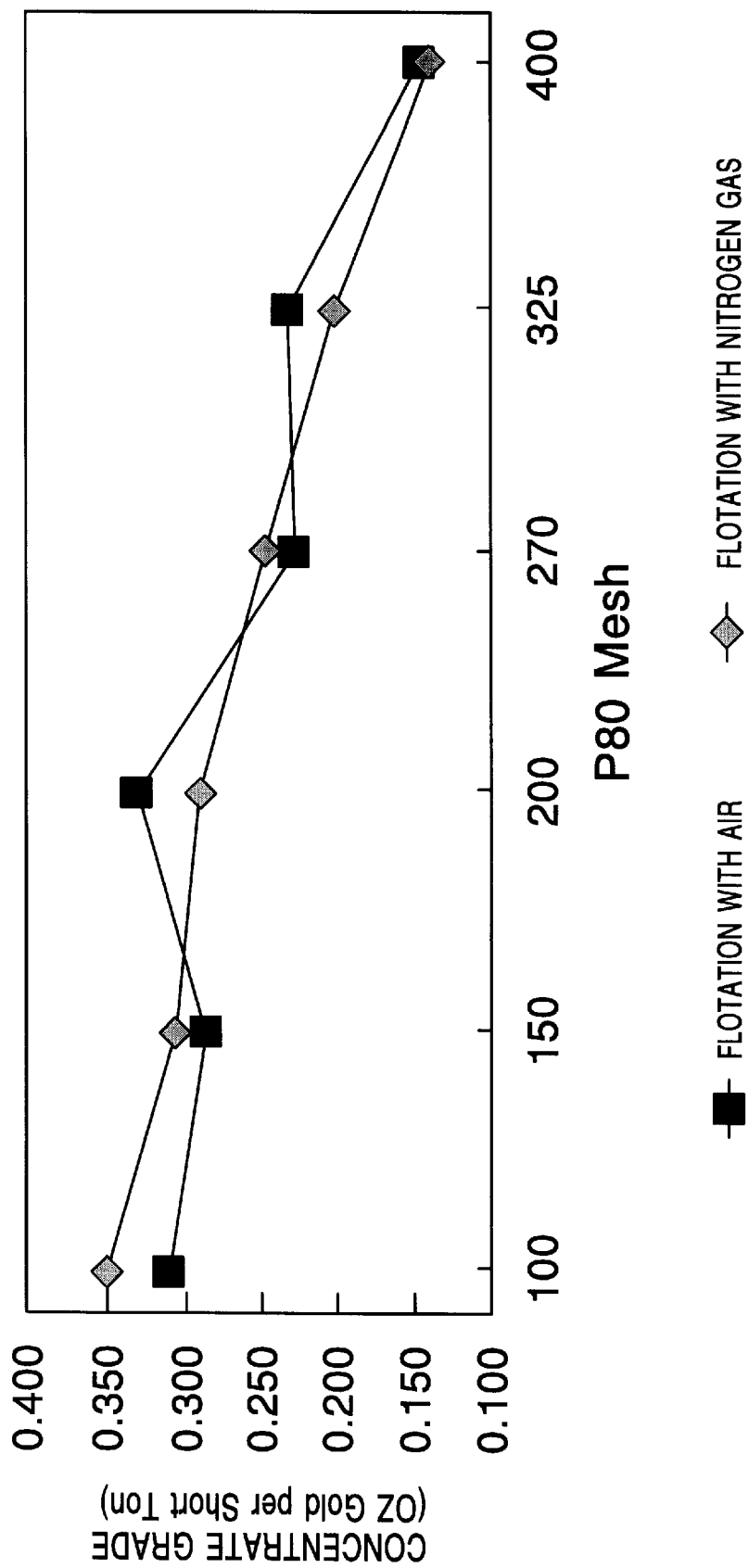
FIG. 4 is a graph of the grade of concentrate recovered from flotation versus grind size Examples 1–6.
Figure 5:
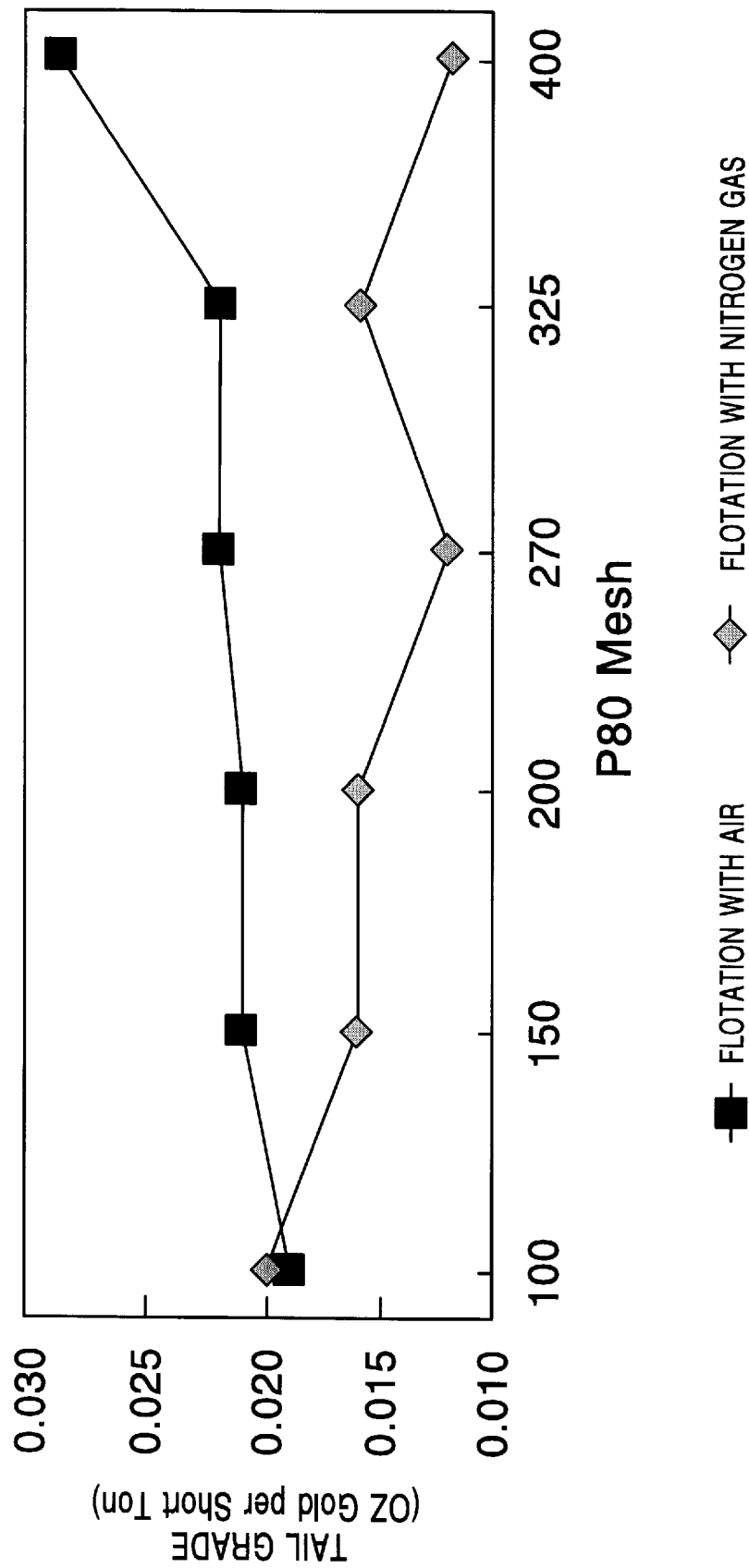
FIG. 5 is a graph of the grade of tails from flotation versus grind size Examples 1–6.
Figure 6:
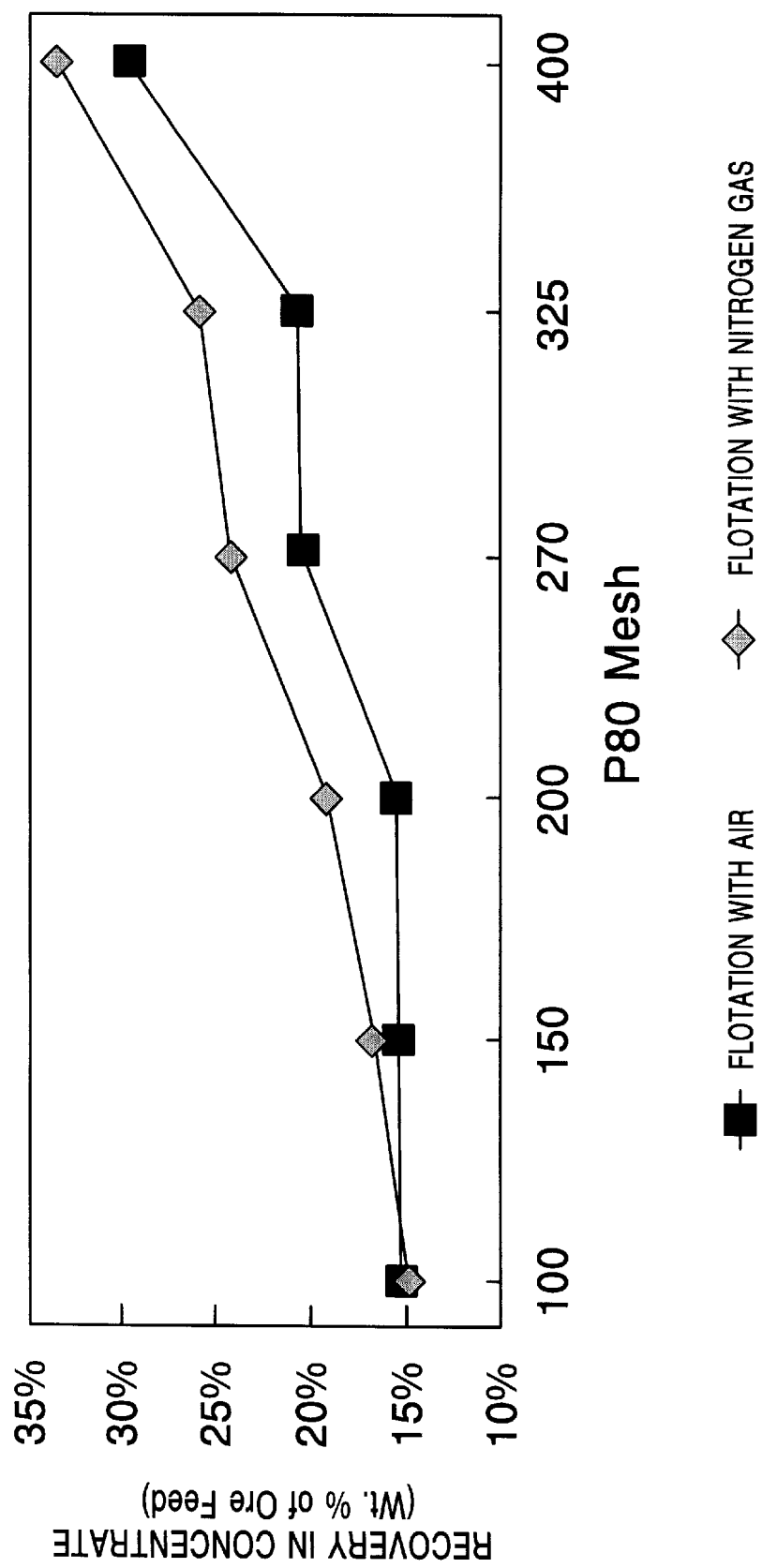
FIG. 6 is a graph of concentrate weight percent recovery from flotation versus grind size for Examples 1–6.
Figure 7:
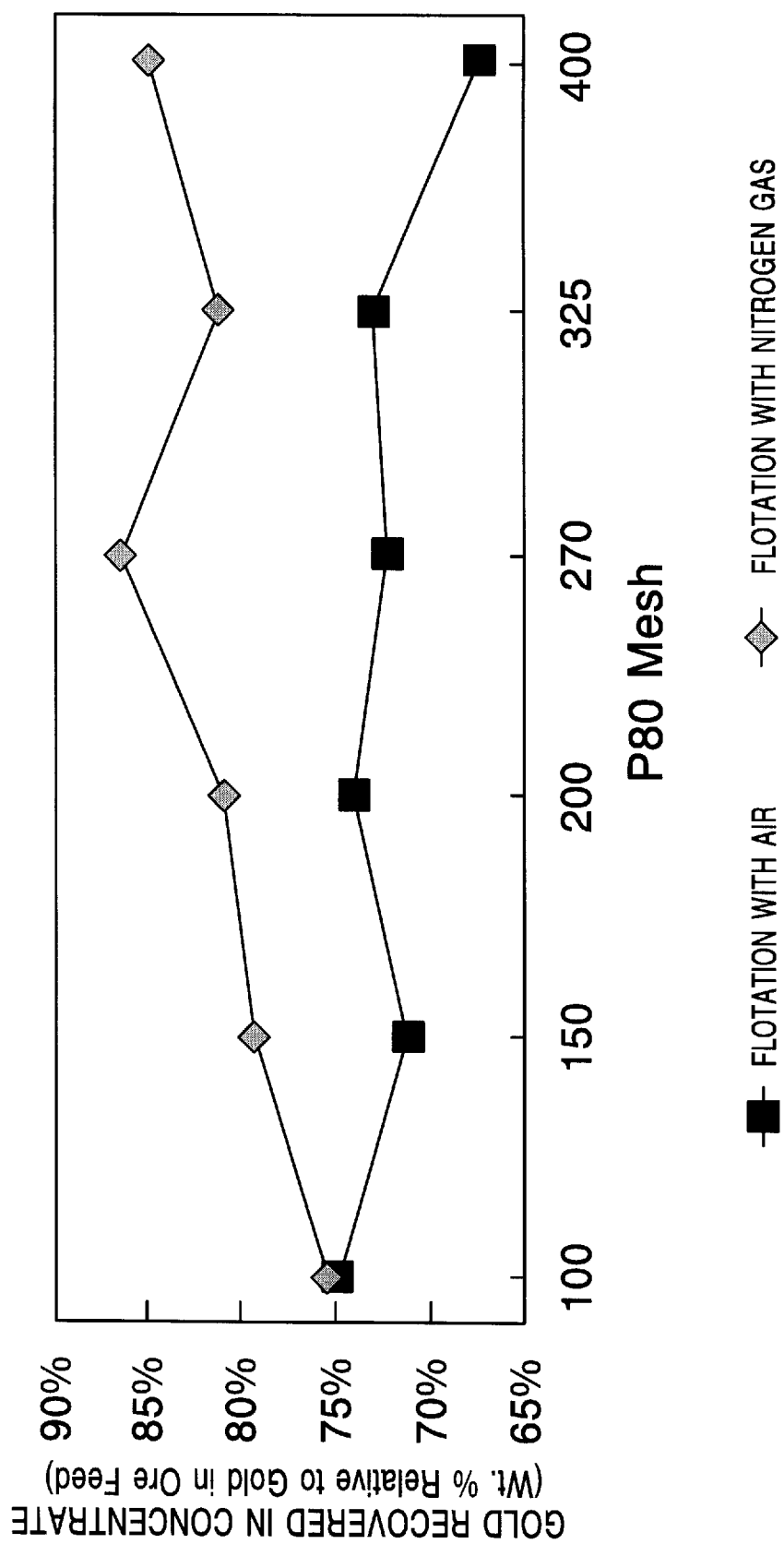
FIG. 7 is a graph of gold recovered in concentrate from flotation versus grind size for Examples 1–6.

[1]80 weight percent of material passing the indicated size
[2]ounces of gold per short ton of concentrate
[3]ounces of gold per short ton of tail
[4]weight percent of ore sample feed reporting to concentrate
[5]% of gold in ore sample feed reporting to concentrate FIG. 4 graphically shows the grade of the flotation concentrate (measured as ounces of gold per short ton of concentrate material) as a function of the grind size. As seen in FIG. 4, no identifiable effect on the grade of the concentrate is apparent from using nitrogen gas relative to using air in the flotation. FIG. 5, however, shows that the flotation tail, at smaller grind sizes, contains a significantly lower gold value when using nitrogen gas as a flotation gas than when using air. Therefore, when using nitrogen gas, more of the gold-bearing sulfide minerals are recovered in the concentrate, apparently without any detrimental effect to the grade of the concentrate recovered. FIG. 6 shows that the amount of material recovered in the concentrate may be significantly higher when using nitrogen gas as a flotation gas than when using air, especially at the smaller grind sizes. FIG. 7 shows that gold recovery in the concentrate may be increased by almost 15% at a P80 grind of 270 mesh, when using nitrogen gas as a flotation gas as opposed to air, again without detrimental effect to the grade of concentrate recovered.

It should be noted that at a P80 grind of 100 mesh, there is no significant difference in flotation performance when using nitrogen gas as opposed to air as the flotation gas. It is, therefore, surprising and unexpected that the performance using nitrogen gas would improve so markedly relative to air at the smaller grind sizes. Typically, it is expected that flotation performance should improve with a smaller grind size due to a more complete liberation of sulfide minerals from non-sulfide gangue material. As seen in FIG. 7, however, the gold recovery in the concentrate when using air as the flotation gas is flat, at best. When using nitrogen gas, however, gold recovery generally increases with decreased grind size due to increased sulfide mineral particle liberation, as would normally be expected.

One way to explain the unexpectedly poor flotation performance when using air, to assist in the understanding in the present invention but not to be bound by theory, is that some detrimental chemical process may be occurring when air is render them less responsive to flotation. As the grind becomes smaller, the surface area available for oxidation of the sulfide minerals increases significantly and, accordingly, any beneficial effect from more complete liberation of sulfide mineral due to the smaller grind size is offset by increased surface oxidation, further depressing flotation of the sulfide mineral particles. Nitrogen gas, however, would not oxidize the surface of sulfide minerals and, therefore, permits better flotation of sulfide mineral particles, resulting in a higher recovery of sulfide minerals at the smaller grind sizes, as would normally be expected.

Example 7

This example further demonstrates the beneficial use of nitrogen gas in the flotation of gold-bearing sulfide ores, and the use of a rougher-scavenger-cleaner arrangement of flotation to enhance recovery of concentrate.

A flotation pilot plant is operated using a low grade sulfide ore from the Lone Tree Mine, as previously described with Examples 1–6. The pilot plant flow is shown in FIG. 8.

Figure 8:
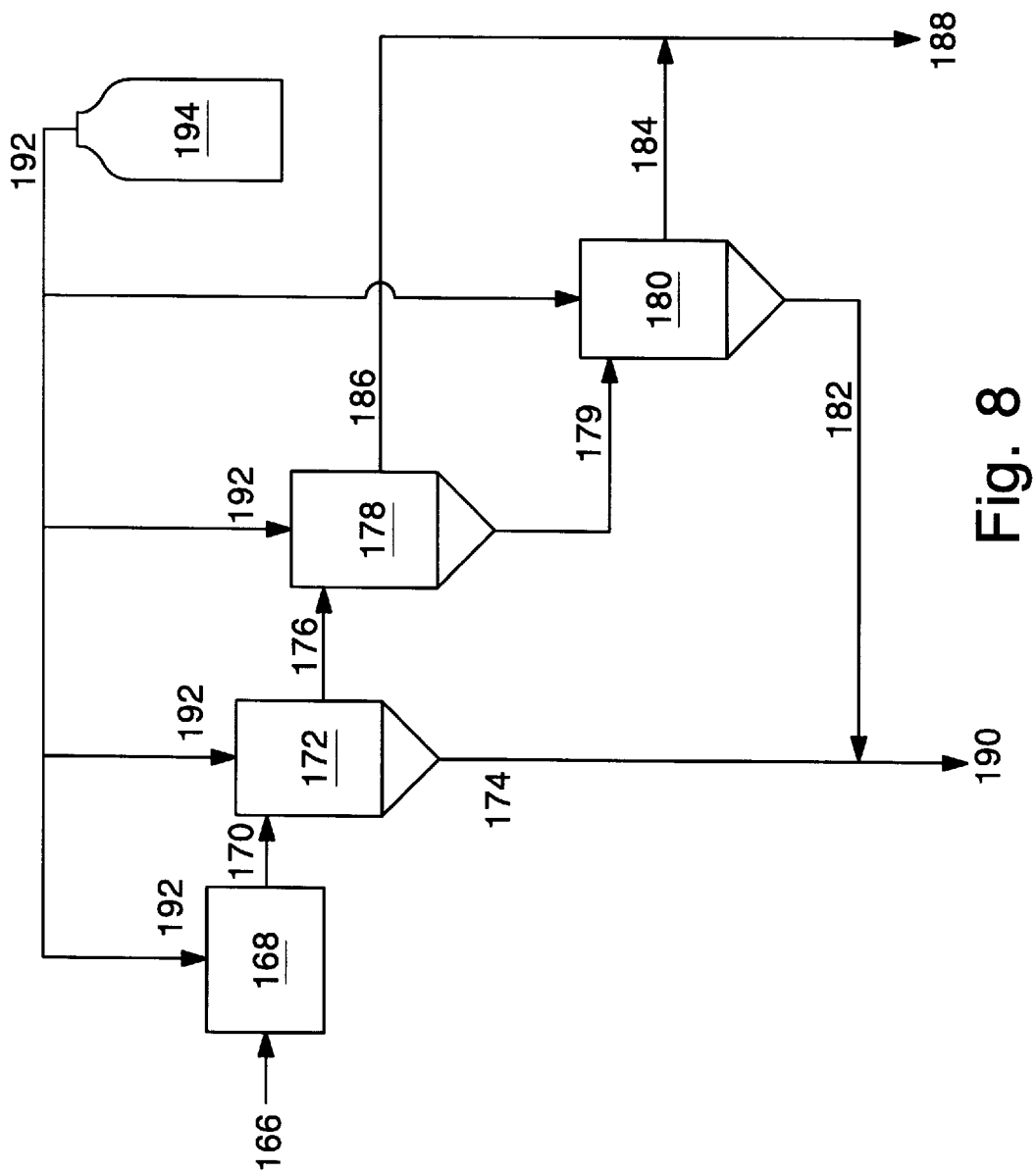
FIG. 8 is a flow diagram for one embodiment of the present invention relating to a pilot plant for Example 7.

With reference to FIG. 8, the ore sample 166 is subjected to comminution 168 in a ball mill to a P80 size of 270 mesh. The ground ore, in a slurry 170, is introduced into a rougher flotation step 172. In the rougher flotation step 172, an initial flotation separation is made with a rougher concentrate 174 being collected with the flotation froth and a rougher tail 176 being sent to a scavenger flotation step 178, material collected in the flotation froth of the scavenger flotation step 178 is repulped and introduced, as a slurry 179, to a cleaner flotation step 180, where a final flotation separation is made to produce a cleaner concentrate 182 from the froth and a cleaner tail 184. The cleaner tail 184 is combined with a scavenger tail 186, from the scavenger flotation step 178, to produce the final tail 188. The rougher concentrate 174 and the cleaner concentrate 182 are combined to form a final concentrate 190. In this example, the rougher flotation step 172 is accomplished in a single dual compartment flotation cell, the scavenger flotation step 178 is accomplished in a series of three dual compartment flotation cells, and the cleaner flotation step 180 is accomplished in a series of three dual compartment flotation cells. As shown in FIG. 8, nitrogen gas 192 is supplied from gas tank 194 and is fed to each of the comminution step 168, the rougher flotation step 172, the scavenger flotation step 178 and the cleaner flotation step 180. The nitrogen gas 192 is used as the flotation gas in each of the flotation steps and is used as a blanketing gas to prevent air from oxidizing ore particles during the comminution 168. The nitrogen gas is also used to blanket all other process equipment, not shown, such as pumps and mixing tanks. Gold-bearing sulfide minerals in the ore sample 166 are, therefore, maintained in a substantially air-free environment through the entire pilot plant, until the gold-bearing sulfide minerals have been recovered in a desired concentrate product.

The results of the pilot plant are shown in Table 3, which shows that the final concentrate 190 from the pilot plant is of a higher quality than the concentrates shown in Examples 1–6. Addition of the scavenger flotation step 178 and the cleaner flotation step 180 in the pilot plant significantly improves the grade of concentrate finally recovered, without any appreciable loss of gold recovery.

TABLE 3

LONE TREE PILOT PLANT

| Example | Grind P80 Mesh[1] | Final Concentrate Grade oz gold/st[2] | Tail Grade oz gold/st[3] | Final Concentrate Recovery wt %[4] | Gold Reporting to Final Concentrate % gold recovery[5] |
|---|---|---|---|---|---|
| 7 | 270 | 0.57 | .0095 | 9.4 | 86.4 |

[1]80 weight percent of material passing the indicated size
[2]ounces of gold per ton of respective concentrate
[3]ounces of gold per short ton of final tail
[4]weight percent of ore sample feed reporting to respective concentrate
[5]% of gold in concentrate relative to feed for the respective floatation step

Example 8

Laboratory tests are performed on samples of a low grade gold-bearing sulfide ore from Santa Fe Pacific Gold Corporation's Twin Creeks Mine in Nevada. A representative analysis of an ore sample is shown in Table 4. For each test, a sample is ground to the appropriate size and a portion of each sample is then subjected to flotation using air as a flotation gas and another portion is subjected to flotation using nitrogen as a flotation gas. Substantially the same flotation conditions are used as described for Examples 1–6.

TABLE 4

Twin Creeks SUBGRADE SULFIDE ORE
REPRESENTATIVE HEAD ANALYSIS

| | |
|---|---|
| Gold | 0.085 oz/st[1] |
| Silver | 0.28 oz/st[1] |
| Total Sulfur | 6.45 wt. % |
| Sulfide Sulfur | 6.27 wt. % |
| Arsenic | 1630 ppm by wt. |

[1]ounces per short ton of ore

Figure 9:
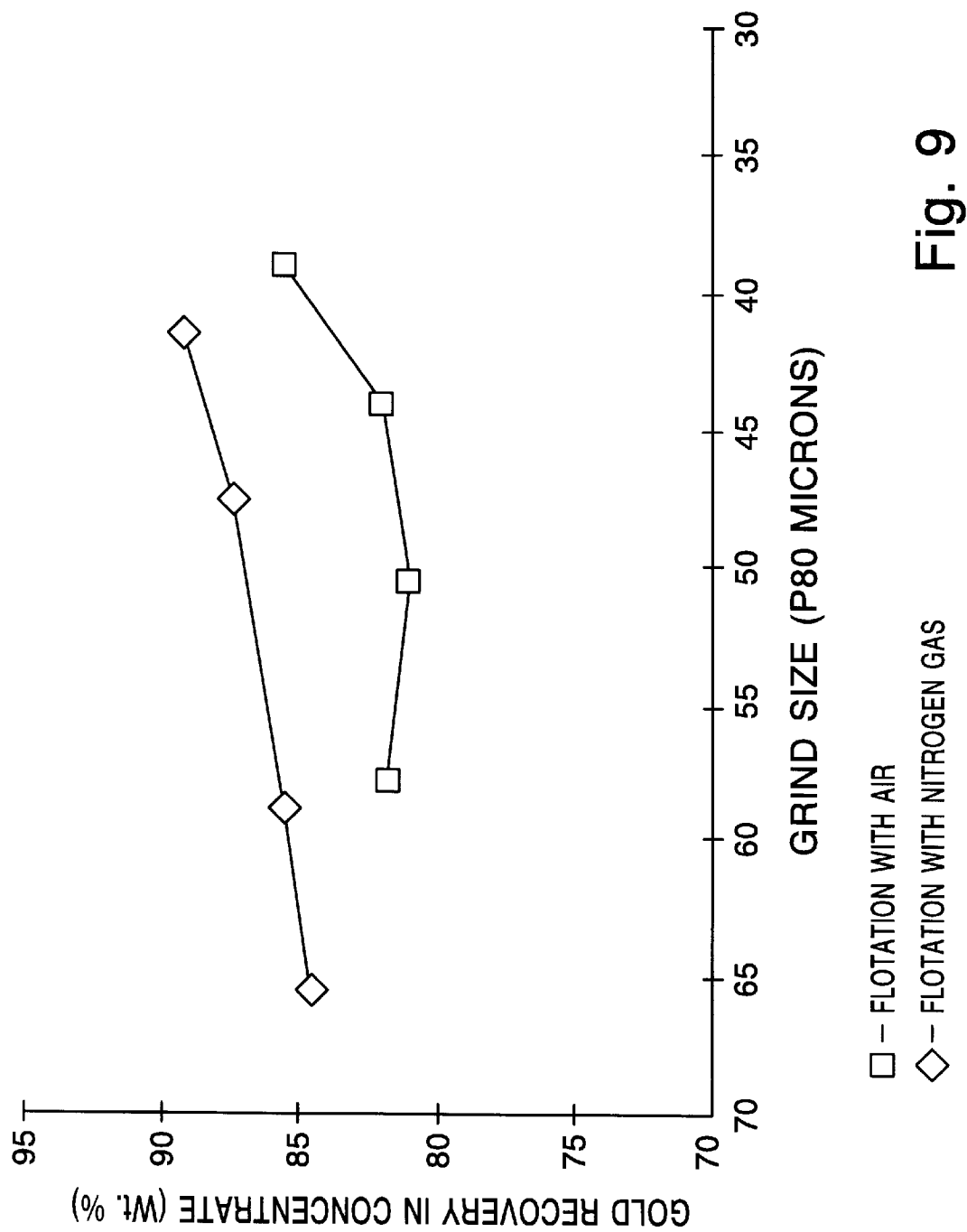
FIG. 9 is a graph of gold recovery in concentrate from flotation versus grind size for Example 8.

The results of Example 8 are graphically shown in FIG. 9 which shows a plot of gold recovery in the concentrate as a function of grind size. As seen in FIG. 9, the use of nitrogen gas generally results in a significantly higher recovery of gold in the concentrate compared to the use of air as a flotation gas.

Examples 9–28

These examples demonstrate the importance of flotation pH and the choice of activators for use during flotation with the present invention.

A series of laboratory flotation tests are performed using Lone Tree low grade gold-bearing sulfide ore samples. Prior to flotation, each sample is ground to a p80 size of about 60 microns. One series of tests are performed using a nitrogen atmosphere in the grind and nitrogen flotation gas with varying flotation pH using lead nitrate as an activator. A second series of tests are performed using air as the grinding atmosphere and air as the flotation gas at varying flotation pH's and using lead nitrate as an activator. A third series of tests are performed using nitrogen as the grinding environment and nitrogen flotation gas with varying flotation pH and using copper sulfate as an activator. The pH is adjusted by either the addition of sulfuric acid or calcium hydroxide, as required. Also, other normal flotation reagents are used in each test. Conditions for the grind and flotation for each example are shown in Table 5 and specific reagents used with each example are shown in Table 6.

Figure 18:
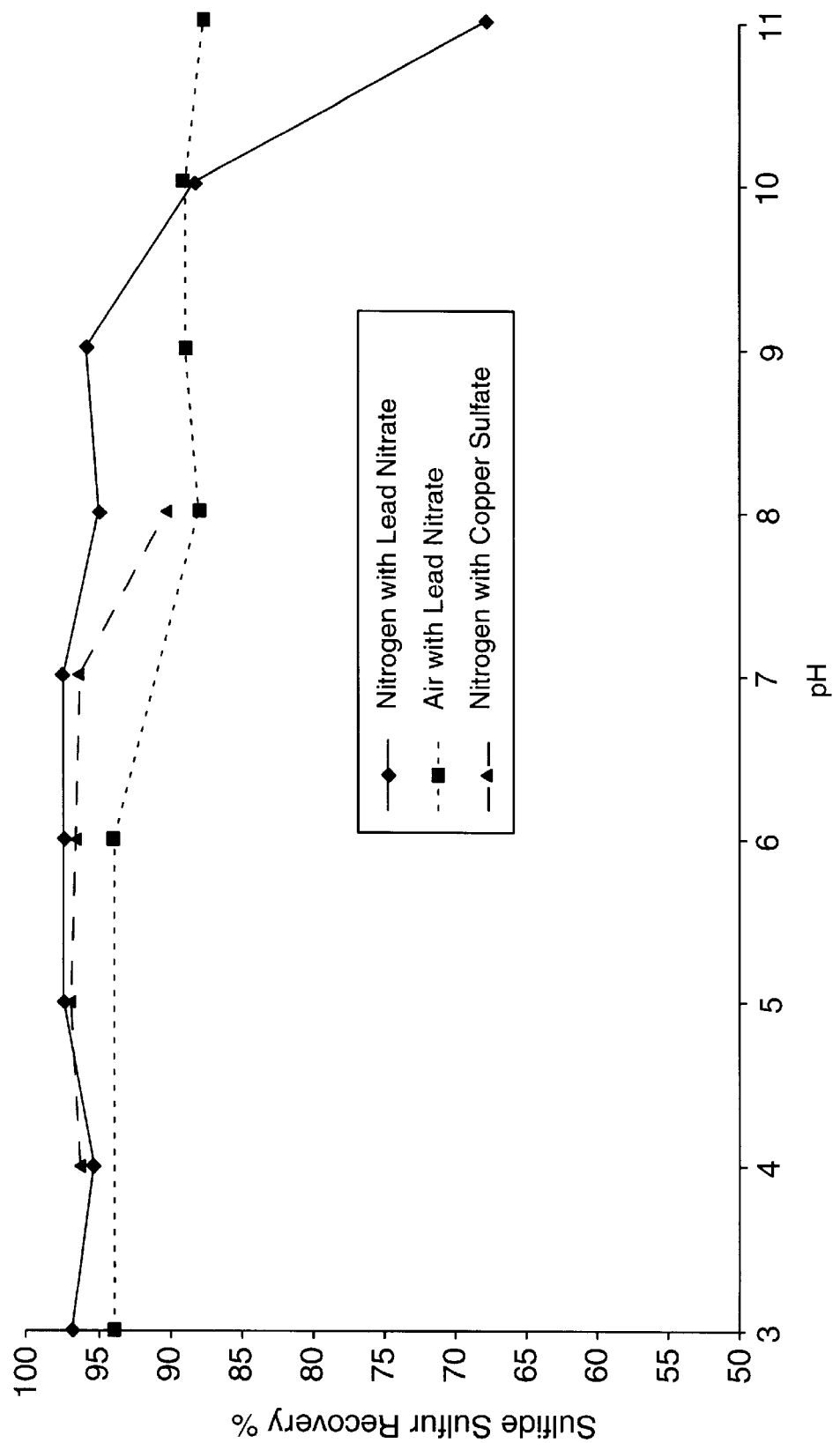
FIG. 18 is a graph with plots of sulfide sulfur recovery versus pH for Examples 9–28.
Figure 19:
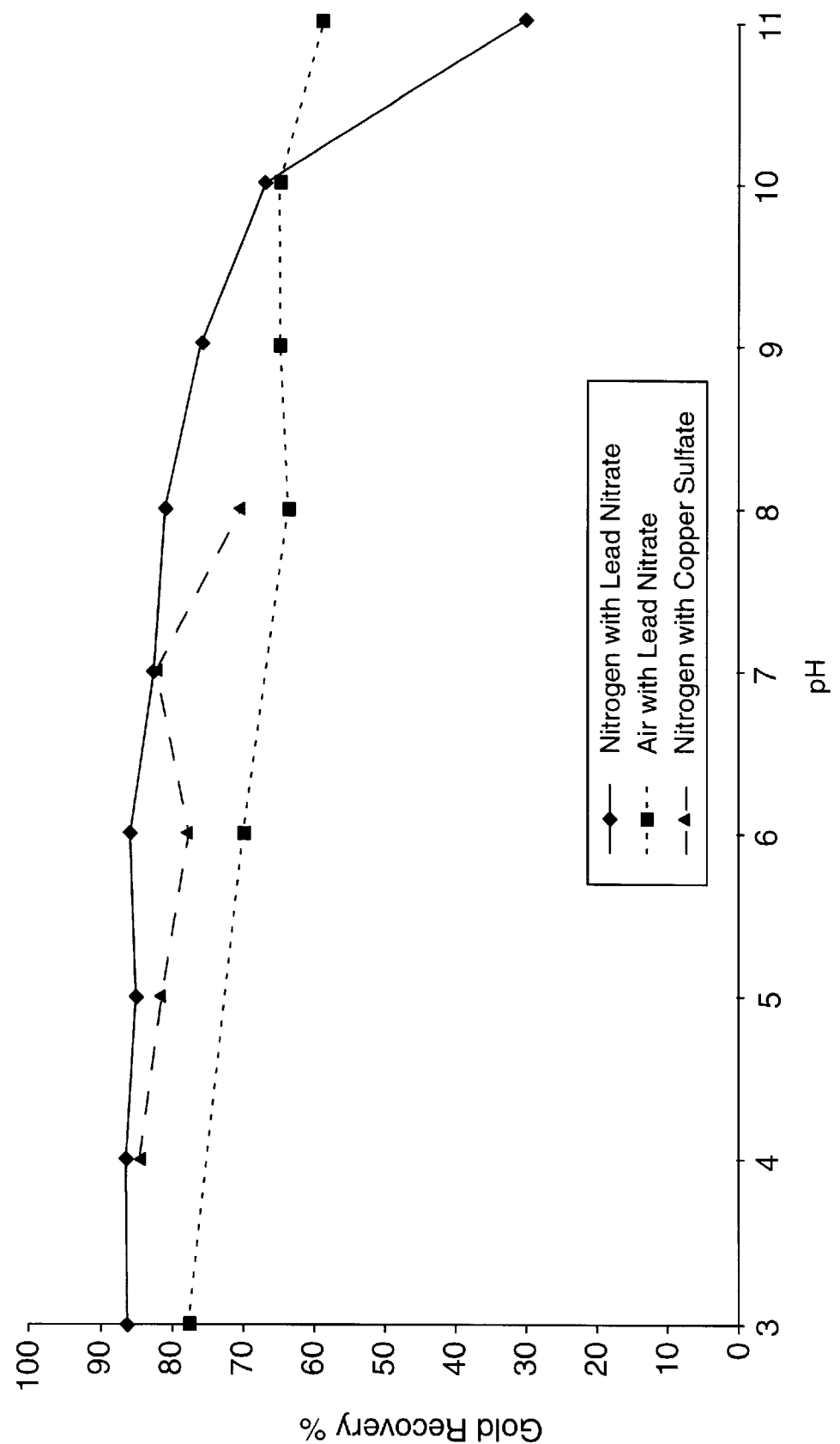
FIG. 19 is a graph including plots of gold recovery versus pH for Examples 9–28.
Figure 20:
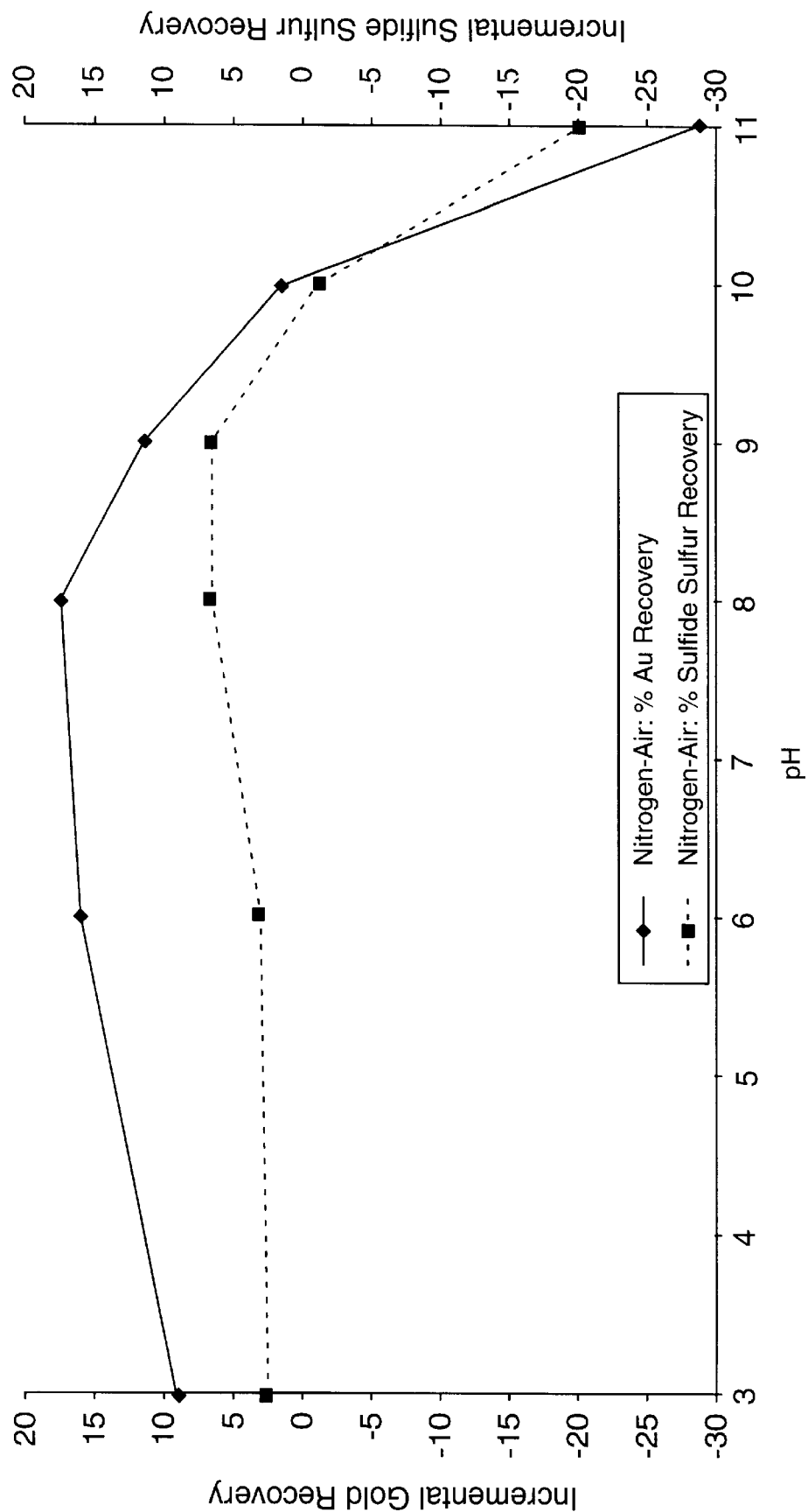
FIG. 20 is a graph including plots of incremental gold recovery and incremental sulfide sulfur recovery for Examples 9–28.

Results of the flotation are shown tabularly in Table 7 and graphically in FIGS. 18–20. FIG. 18 has plots of sulfide sulfur recovery in the flotation concentrate versus flotation pH for each of the three test series. FIG. 19 has plots of gold recovery in the flotation concentrate versus flotation pH for each of the three test series. As seen in Tables 5–7 and FIGS. 18 and 19, grinding and flotation using nitrogen gas provides significantly enhanced performance relative to air for all but the highest pH's. Furthermore, gold recoveries in the concentrate are best at acidic pH's, and particularly at pH's below about 6. Moreover, quite surprisingly, lead nitrate as an activator consistently shows a significantly higher gold recovery in the concentrate than the more standard activator of copper sulfate.

FIG. 20 includes a plot of the difference in percentage gold recoveries in the concentrate using nitrogen versus air for various flotation pH's and a plot of the difference in percentage recovery of sulfide sulfur in the concentrate using nitrogen versus air for various flotation pH's. A dramatic effect of pH is revealed in FIG. 20 at lower pH's. For example, at pH 6, gold recovery in the concentrate increases by greater than 15 percentage points for nitrogen versus air with less than a 5 percentage point increase in sulfide sulfur recovery. These results further indicate that gold is often associated with sulfide mineral types that are particularly difficult to recover in a concentrate using conventional flotation with air as a flotation gas. These difficult-to-float sulfide mineral types float extremely well, however, with the use of nitrogen, especially when a lead-containing activator is used at an advantageously acidic pH. These results, especially at pH's below about 6, are particularly surprising.

TABLE 5

| | Grind | | Floatation | |
|---|---|---|---|---|
| Example | Atmosphere | P-80 size (microns) | Floatation Gas | pH |
| 9 | nitrogen | 62 | nitrogen | 3 |
| 10 | nitrogen | 62 | nitrogen | 4 |
| 11 | nitrogen | 60 | nitrogen | 5 |
| 12 | nitrogen | 60 | nitrogen | 6 |
| 13 | nitrogen | 60 | nitrogen | 7 |
| 14 | nitrogen | 60 | nitrogen | 8 |
| 15 | nitrogen | 60 | nitrogen | 9 |
| 16 | nitrogen | 60 | nitrogen | 10 |
| 17 | nitrogen | 60 | nitrogen | 11 |
| 18 | air | 60 | air | 3 |
| 19 | air | 60 | air | 6 |
| 20 | air | 60 | air | 8 |
| 21 | air | 60 | air | 9 |
| 22 | air | 60 | air | 10 |
| 23 | air | 60 | air | 11 |
| 24 | nitrogen | 64 | nitrogen | 4 |
| 25 | nitrogen | 64 | nitrogen | 5 |
| 26 | nitrogen | 64 | nitrogen | 6 |
| 27 | nitrogen | 64 | nitrogen | 7 |
| 28 | nitrogen | 64 | nitrogen | 8 |

TABLE 6

| | Reagents (lb/ton) | | | | | | | |
|---|---|---|---|---|---|---|---|---|
| Example | Sodium Silicate | MIBC[1] | DF250[2] | Sulfuric Acid | Calcium Hydroxide | PAX[3] | Lead Nitrate | Copper Sulfate |
| 9 | 0.1 | 0.14 | 0.24 | 8.86 | 0 | 0.5 | 0.2 | 0 |
| 10 | 0.1 | 0.12 | 0.27 | 4.22 | 0 | 0.5 | 0.2 | 0 |
| 11 | 0.1 | 0.14 | 0.25 | 2.1 | 0 | 0.5 | 0.2 | 0 |
| 12 | 0.1 | 0.14 | 0.2 | 1.3 | 0 | 0.5 | 0.2 | 0 |
| 13 | 0.1 | 0.1 | 0.1 | 0 | 0.27 | 0.5 | 0.2 | 0 |
| 14 | 0.1 | 0.12 | 0.15 | 0 | 2.49 | 0.5 | 0.2 | 0 |
| 15 | 0.1 | 0.11 | 0.11 | 0 | 3.24 | 0.5 | 0.2 | 0 |
| 16 | 0.1 | 0.1 | 0.07 | 0 | 3.96 | 0.5 | 0.2 | 0 |
| 17 | 0.1 | 0.11 | 0.11 | 0 | 5.56 | 0.5 | 0.2 | 0 |
| 18 | 0.1 | 0.2 | 0.21 | 6.56 | 0 | 0.5 | 0.2 | 0 |
| 19 | 0.1 | 0.15 | 0.16 | 0 | 1.16 | 0.5 | 0.2 | 0 |
| 20 | 0.1 | 0.15 | 0.13 | 0 | 2.84 | 0.5 | 0.2 | 0 |
| 21 | 0.1 | 0.15 | 0.14 | 0 | 3.44 | 0.5 | 0.2 | 0 |
| 22 | 0.1 | 0.16 | 0.14 | 0 | 4.54 | 0.5 | 0.2 | 0 |
| 23 | 0.1 | 0.15 | 0.13 | 0 | 5.82 | 0.5 | 0.2 | 0 |
| 24 | 0.1 | 0.20 | 0.20 | 4.15 | 0 | 0.5 | 0 | 0.2 |
| 25 | 0.1 | 0.19 | 0.19 | 2.17 | 0 | 0.5 | 0 | 0.2 |
| 26 | 0.1 | 0.18 | 0.18 | 0.85 | 0 | 0.5 | 0 | 0.2 |
| 27 | 0.1 | 0.16 | 0.13 | 0 | 0.3 | 0.5 | 0 | 0.2 |
| 28 | 0.1 | 0.18 | 0.11 | 0 | 2.34 | 0.5 | 0 | 0.2 |

[1]Methyl isobutyl carbanol
[2]Polyethylene glycol
[3]Potassium amyl xanthate

TABLE 7

| | Recovery in Concentrate | |
|---|---|---|
| Example | Gold (%) | Sulfide Sulfur (%) |
| 9 | 86.7 | 96.8 |
| 10 | 86.7 | 95.3 |
| 11 | 85 | 97.3 |
| 12 | 86 | 97.3 |

TABLE 7-continued

| | Recovery in Concentrate | |
|---|---|---|
| Example | Gold (%) | Sulfide Sulfur (%) |
| 13 | 82.6 | 97.5 |
| 14 | 81.1 | 95 |
| 15 | 76.5 | 95.9 |
| 16 | 67.7 | 88.6 |
| 17 | 30.8 | 67.7 |
| 18 | 77.7 | 93.9 |
| 19 | 70.1 | 94 |
| 20 | 63.8 | 88.2 |
| 21 | 65.2 | 89.2 |
| 22 | 65.8 | 89.4 |
| 23 | 59.6 | 88.1 |
| 24 | 84.8 | 96.3 |
| 25 | 81.6 | 96.9 |
| 26 | 77.8 | 96.7 |
| 27 | 82.4 | 96.4 |
| 28 | 70.8 | 90.4 |

Examples 29–35

This example demonstrates the importance of the choice of collector reagent in performing the flotation of the present invention.

Laboratory flotation tests are performed on samples of Twin Creeks low grade gold-bearing sulfide ore at a pH of from about pH 5 to about pH 6 using various collector reagents in cost equivalent amounts. A list of the different collector reagents, companies that supply the reagents and the amount of each collector reagent used are shown in Table 8. Nitrogen gas is used in the grind and as the flotation gas. Particles are sized at a P80 size of about 46 microns and flotation is conducted in a slurry with 30% solids. The ore samples are of a low grade gold-bearing sulfide ore having about 0.072 ounces per ton of gold and about 5.58 weight percent sulfide sulfur. Other reagents used during the flotation tests are shown in Table 9.

Figure 21:
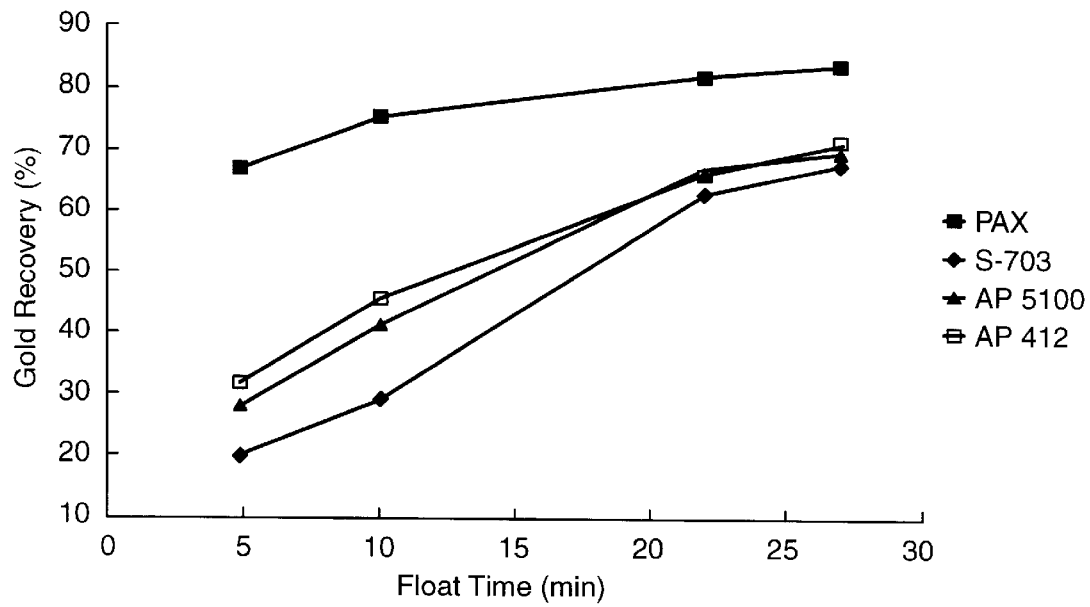
FIG. 21 is a graph including plots of gold recovery versus flotation time for Examples 29–35.
Figure 22:
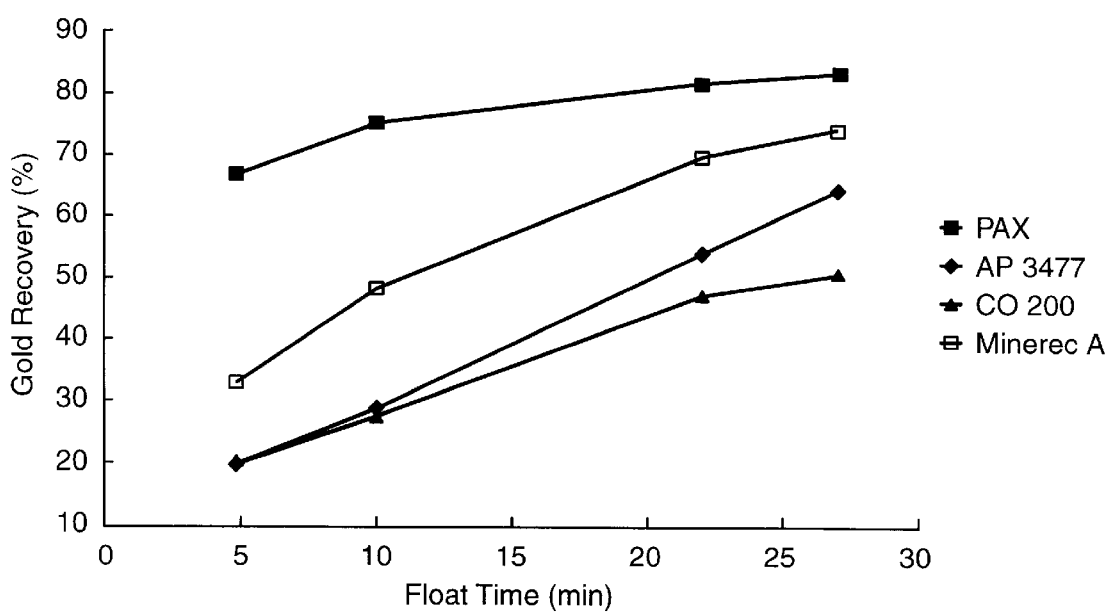
FIG. 22 is a graph of gold recovery versus flotation time for Examples 29–35.

Results of the flotation tests are shown in FIGS. 21 and 22, which plot percent gold recovery in the concentrate versus flotation time for the various collector reagents. As shown in FIGS. 21 and 22, potassium amyl xanthate performs anomalously better than the other collectors with the flotation of the present invention.

TABLE 8

| Example | Collector | Source | Amount lb/ton |
|---|---|---|---|
| 29 | PAX[1] | Kerly Mining, Inc. | 0.50 |
| 30 | S-703[2] | Minerals Reagents Inc. | 0.14 |
| 31 | AP-5100[3] | Cytec Industries, Inc. | 0.17 |
| 32 | AP-412[4] | Cytec Industries, Inc. | 0.30 |
| 33 | AP-3477[5] | Cytec Industries, Inc. | 0.50 |
| 34 | CO-200[6] | Phillips 66 Company | 0.18 |
| 35 | Minerec A[7] | Minerec Mining Chemicals | 0.17 |

[1] potassium amyl xanthate
[2] ethyl octyl sulfide, dialkyl dithiophosphate, polyglycol alkyl ether
[3] alkyl thionocarbonate
[4] Na-mercapto-benzothiazole and Na-di-iso-amyl dithiophosphate
[5] Na di-iso butyl dithiophosphate
[6] t-dodecyl mercaptan
[7] xanthogen formate

TABLE 9

| | Other Reagents (lb/ton) | | | | |
|---|---|---|---|---|---|
| Example | Sulfuric Acid | MIBC | DF250 | Lead Nitrate | Sodium Silicate |
| 29 | 7.76 | 0.12 | 0.25 | 0.3 | 1.0 |
| 30 | 4.8 | 0.11 | 0.07 | 0.3 | 1.0 |
| 31 | 4.37 | 0.07 | 0.07 | 0.3 | 1.0 |
| 32 | 5.0 | 0.09 | 0.09 | 0.3 | 1.0 |
| 33 | 5.04 | 0.04 | 0.04 | 0.3 | 1.0 |
| 34 | 5.74 | 0.17 | 0.17 | 0.3 | 1.0 |
| 35 | 5.49 | 0.11 | 0.11 | 0.3 | 1.0 |

Example 36

This example demonstrates the importance of grind media on operation of the flotation of the present invention.

Laboratory flotation is conducted on Lone Tree low grade gold-bearing sulfide ore samples using nitrogen during the grind and during flotation as the flotation gas. All samples were ground to a P80 size of about 44 microns. One sample is comminuted using stainless steel rods while the other sample is comminuted using conventional mild steel balls.

Figure 23:
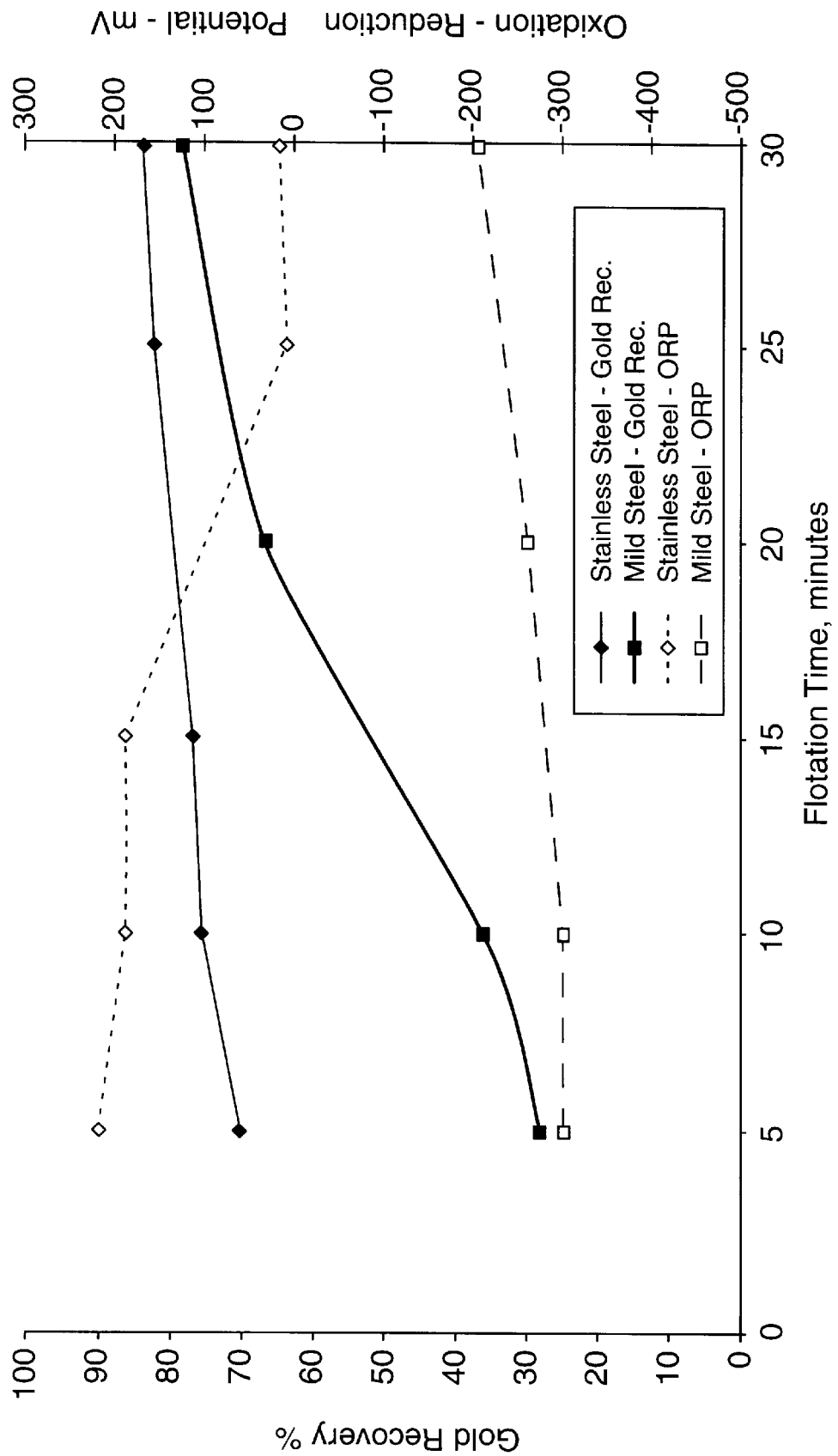
FIG. 23 is a graph including plots of gold recovery and oxidation-reduction potential versus flotation time for Example 36.

Results of the flotation are shown graphically in FIG. 23, which includes a plot of percent gold recovery versus flotation time for each sample and a plot of oxidation reduction potential versus flotation time for each sample. As shown in FIG. 23, the sample milled with stainless steel rods exhibits substantially higher gold recovery at all flotation times. More importantly, a high gold recovery is achieved in a much shorter flotation time for the sample milled with the stainless steel rods than for the sample milled with the mild steel balls. This distinction is significant because it indicates that flotation times may be reduced with the use of stainless steel or other comminution media, such as a high chromium alloy hardened steel, that would introduce less reactive iron into the flotation system.

Example 37

This example demonstrates a surprising effect of performing a magnetic separation on a ore sample prior to flotation according to the present invention.

Samples of Lone Tree subgrade gold-bearing sulfide ore are subjected to laboratory flotation. Both samples are comminuted to a P80 size of approximately 270 mesh. Following comminution, one sample is subjected to magnetic separation to remove magnetic iron particles prior to flotation while the other sample is not.

Figure 24:
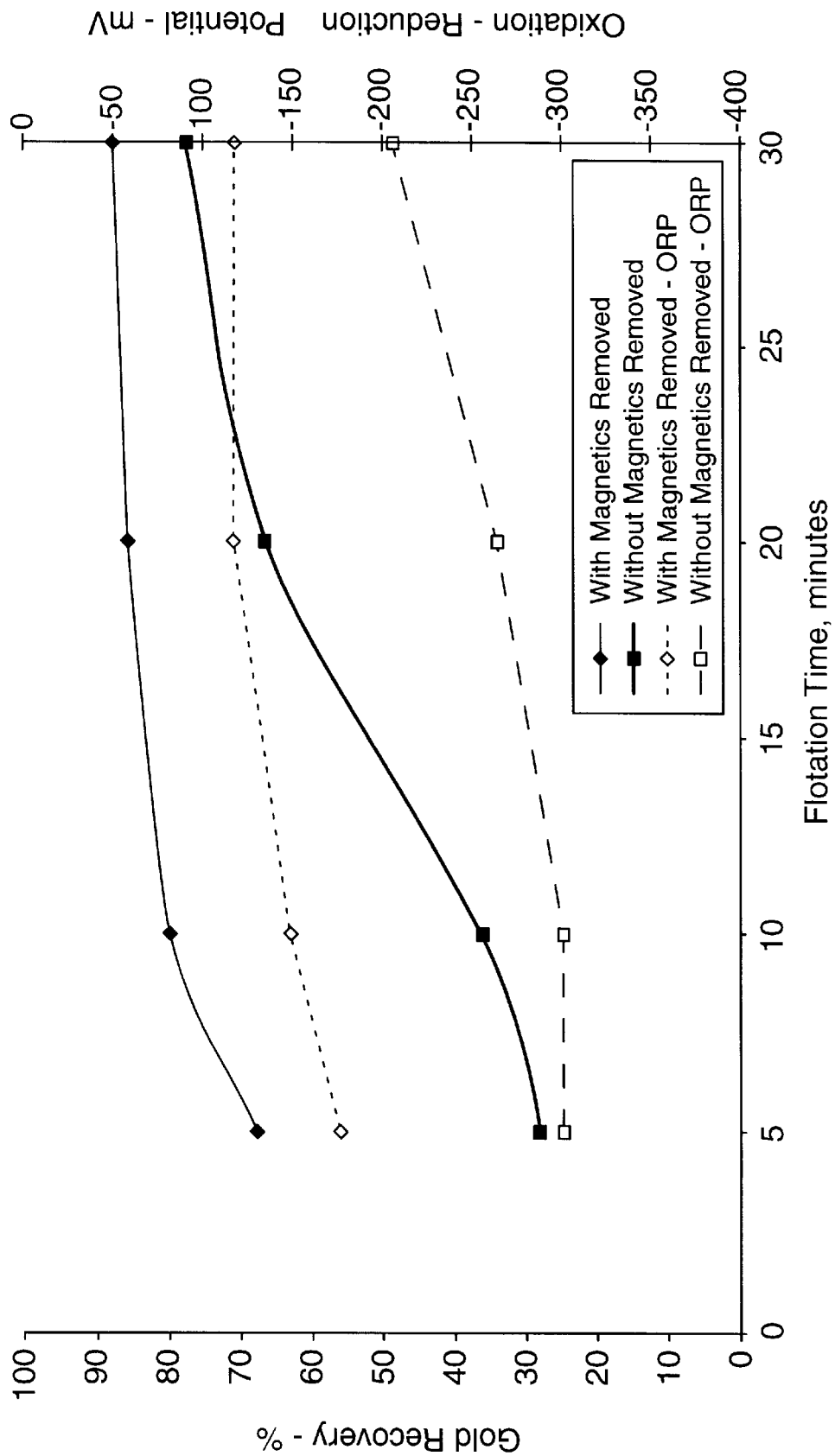
FIG. 24 is a graph including plots of gold recovery and oxidation-reduction potential versus flotation time for Example 37.

Results are shown graphically in FIG. 24, which includes a plot of percent gold recovery in the flotation concentrate versus flotation time and a plot of oxidation-reduction potential in the flotation slurry versus flotation time. As seen in FIG. 24, gold recovery is significantly higher for the sample subjected to the magnetic separation. The effect is particularly pronounced at shorter flotation times, but even after 30 minutes of flotation, the sample having been subjected to magnetic separation exhibits gold recovery that is approximately ten percentage points higher than the sample with no magnetic separation.

Example 38

This example demonstrates the important effect with the present invention of using deoxygenated process water.

Samples of a Twin Creeks low grade gold-bearing sulfide ore are subjected to laboratory flotation. Samples contain about 0.072 ounces per ton of gold and about 5.58 weight percent of sulfide sulfur. Grinding is performed in a nitrogen atmosphere for each sample and flotation is performed using nitrogen as the flotation gas. Both samples are sized at a P80 size of about 46 microns. One sample is slurried with regular tap water for the flotation. The other sample is slurried with tap water that has been deoxygenated by bubbling nitrogen gas through the water for a sufficient time to remove most of the oxygen previously dissolved in the water.

Figure 25:
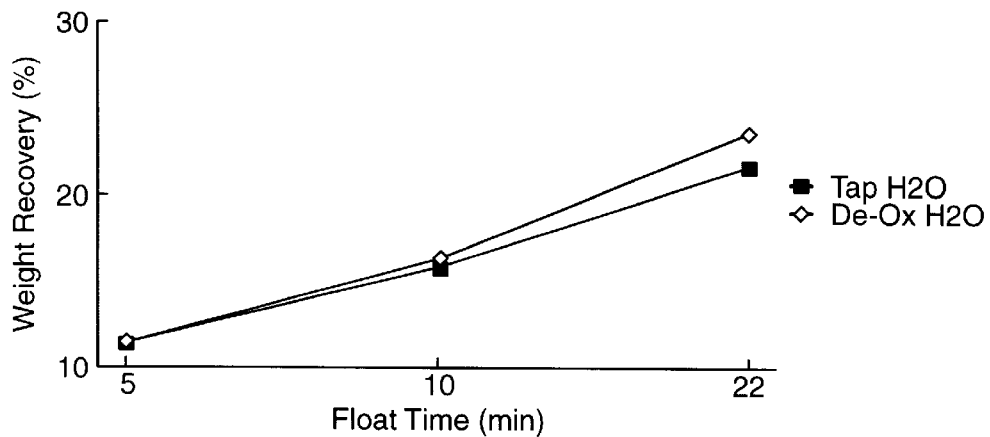
FIG. 25 is a graph including plots of weight recovery versus flotation time for Example 38.
Figure 26:
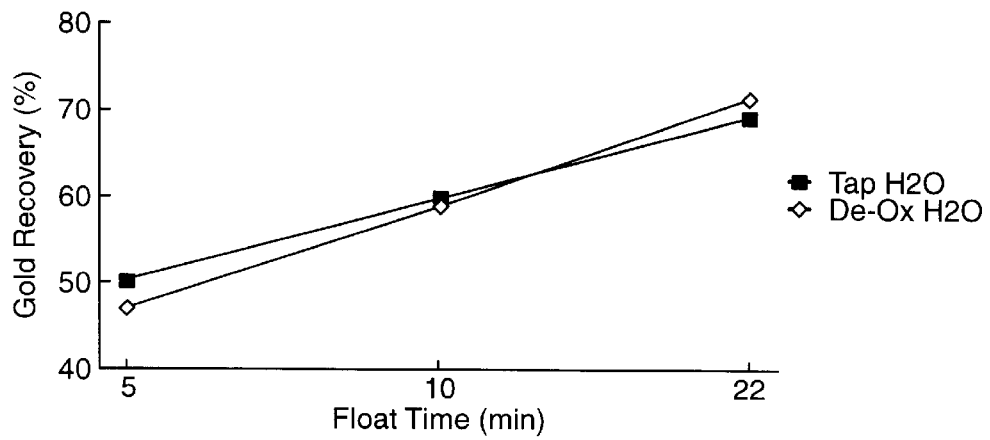
FIG. 26 is a graph including plots of gold-recovery versus flotation time for Example 38.
Figure 27:
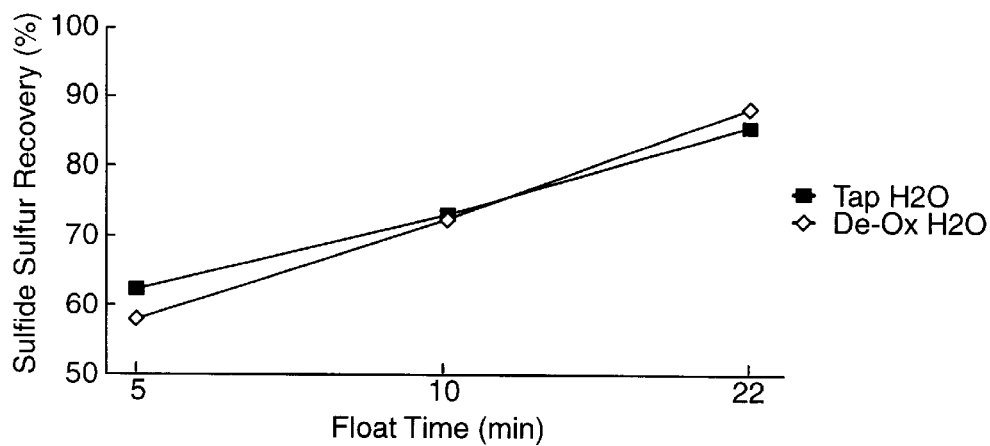
FIG. 27 is a graph including plots of sulfide sulfur recovery versus flotation time for Example 38.

Results of flotation for each sample are shown in FIGS. 25–27. FIG. 25 includes a plot of weight recovery in the concentrate versus flotation time for each sample, and shows that flotation with the deoxygenated water attains a greater weight recovery in the flotation concentrate. FIG. 26 includes a plot of gold recovery in the concentrate versus flotation time for each sample, and shows that at the longer flotation times, gold recovery is higher using the deoxygenated water. FIG. 27 includes a plot of sulfide sulfur recovery in the concentrate versus flotation time, and shows that, at longer flotation times, sulfide sulfur recovery in the concentrate is higher using the deoxygenated water.

Examples 39–57

These examples demonstrate the benefit of a tail leach with the present invention.

Samples of Lone Tree subgrade gold-bearing sulfide ore are subjected to laboratory flotation. Each sample is ground to a P80 size of approximately 270 mesh in a nitrogen atmosphere. Flotation is conducted with a nitrogen flotation gas. Following flotation for each sample, the flotation tail is subjected to a carbon-in-leach cyanidation to recover gold remaining in the flotation tail.

Results are shown in Table 10, where it is seen that the leach of the flotation tail significantly contributes to gold recovery according to the process of the present invention.

TABLE 10

| Example | Gold Recovery[1] Form Flotation Concentrate | Gold Recovery from Flotation Tail | Total Gold Recovery |
|---|---|---|---|
| 39 | 87.3 | 5.7 | 93.0 |
| 40 | 81.6 | 9.1 | 90.7 |
| 41 | 72.9 | 10.3 | 83.2 |
| 42 | 75.6 | 11.4 | 87.0 |
| 43 | 79.0 | 9.2 | 88.2 |
| 44 | 74.5 | 12.3 | 86.8 |
| 45 | 75.5 | 12.8 | 88.3 |
| 46 | 79.9 | 8.9 | 88.8 |
| 47 | 82.4 | 4.3 | 86.7 |
| 48 | 83.6 | 9.8 | 93.4 |
| 49 | 85.5 | 5.4 | 90.9 |
| 50 | 85.6 | 4.6 | 90.2 |
| 51 | 87.9 | 3.9 | 91.8 |
| 52 | 78.8 | 3.5 | 82.3 |
| 53 | 78.4 | 5.8 | 84.2 |
| 54 | 84.4 | 1.5 | 85.9 |
| 55 | 76.6 | 6.1 | 82.7 |
| 56 | 87.1 | 5.4 | 92.5 |
| 57 | 80.7 | 4.0 | 84.7 |

[1]Assumes 96% of gold in concentrate removed in CIL leach following pressure oxidation.

The present invention has been described with reference to specific embodiments of the present invention. According to the present invention, however, any of the features shown in any embodiment may be combined in any way with any other feature of any other embodiment. For example, any feature shown in any one of FIGS. 1–3, 8, 10–17 and 28 can be combined with any other feature shown in any of those figures. Furthermore, while various embodiments of the present invention have been described in detail, it is apparent that modifications and adaptations to those embodiments will occur to those skilled in the art. It is to be expressly understood that such modifications and adaptations are within the scope of the present invention, set forth in the following claims.

What is claimed is:

1. A method for flotation processing of a gold-bearing mineral material feed that is refractory to gold recovery due to association of gold in the mineral material with one or more iron-containing sulfide mineral species, the method comprising the steps of:

subjecting to flotation in a liquid medium said mineral material feed in particulate form, said mineral material feed comprising at least one iron-containing sulfide selected from the group consisting of pyrite, marcasite, arsenopyrite, arsenous pyrite, and pyrrhotite, said flotation including passing bubbles of a flotation gas through said liquid medium;

during said flotation, a first portion of said mineral material feed rising through said liquid medium with said bubbles and said first portion being collected from a flotation froth as a flotation concentrate, a second portion of said mineral material feed being collected as a flotation tail;

said flotation concentrate being enriched, relative to said mineral material feed, in said iron-containing sulfide and in gold;

said flotation tail being depleted, relative to said mineral material feed, in said iron-containing sulfide and in gold;

wherein, said flotation gas comprises no greater than about 10 volume percent of oxygen gas.

2. The method of claim 1, wherein:

said flotation gas comprises less than about 5 volume percent oxygen gas.

3. The method of claim 1, wherein:

said flotation gas comprises greater than about 95 volume percent of gas selected from the group consisting of nitrogen gas, carbon dioxide gas, helium gas, argon gas and combinations thereof.

4. The method of claim 1, wherein:

said flotation gas comprises combustion exhaust.

5. The method of claim 1, wherein:

relative to said mineral material feed, said flotation concentrate is enriched in, and said flotation tail is depleted in, substantially each and every sulfide mineral present in said mineral material feed prior to said flotation.

6. The method of claim 1, wherein:

said flotation is substantially not selective to flotation of said pyrite, marcasite, arsenopyrite, arsenous pyrite and pyrrhotite, so that said flotation concentrate is enriched, relative to said mineral material feed, in substantially any of said pyrite, marcasite, arsenopyrite, arsenous pyrite and pyrrhotite present in said mineral material feed.

7. The method of claim 1, wherein:

after said flotation, said flotation tail is subjected to leaching to remove from said flotation tail gold that is not associated with a sulfide mineral.

8. The method of claim 7, wherein:

said leaching comprises cyanide leaching of gold from said flotation tail.

9. The method of claim 1, wherein:

said liquid medium comprises deoxygenated water.

10. The method of claim 9, wherein:

said deoxygenated water comprises less than about 1.0 part per million by weight of oxygen.

11. The method of claim 9, wherein:

said deoxygenated water, prior to said flotation, had been prepared by passing a gas through water to remove oxygen from said water.

12. The method of claim 1, wherein:

prior to said flotation, said mineral material feed is subjected to wet comminution to reduce the particle size of said mineral material;

water used during said wet comminution comprising deoxygenated water.

13. The method of claim 12, wherein:

said comminution is conducted in an environment that is substantially free of air.

14. The method of claim 1, wherein:

before said flotation, said mineral material feed is subjected to comminution to reduce the particle size of said mineral material feed;

said comminution being conducted in equipment sealed to substantially prevent air from being drawn into said equipment.

15. The method of claim 14, wherein:

said comminution comprises processing said mineral material through a sealed comminution unit having an inlet and an outlet;

a blanketing gas being introduced into at least one of said inlet and said outlet;

said blanketing gas comprising no greater than about 10 volume percent oxygen.

16. The method of claim 15, wherein:

said blanketing gas comprises greater than about 95 volume percent of gas selected from the group consisting of nitrogen gas, carbon dioxide gas, helium gas, argon gas and combinations thereof.

17. The method of claim 14, wherein:

beginning with said comminution and ending with said flotation, said mineral material feed is processed in an environment that is substantially free of oxygen gas.

18. The method of claim 1, wherein:

before said flotation, said mineral material feed is subjected to comminution to reduce the particle size of said mineral material feed;

said comminution being performed in the interior of a vessel having a nonmetallic interior lining to reduce the potential for contamination of said mineral material by iron.

19. The method of claim 1, wherein:

before said flotation, said mineral material feed is subjected to comminution in the presence of grinding media to reduce the particle size of said mineral material;

said grinding media comprising at least one of a corrosion resistant steel and a hardened steel alloy.

20. The method of claim 19, wherein:

said grinding media comprises at least one of stainless steel and chromium alloy steel.

21. The method of claim 1, wherein:

before said flotation, said mineral material feed is subjected to magnetic separation to remove particles of magnetic iron to reduce galvanic interaction involving iron during said flotation.

22. The method of claim 1, wherein:

a lead-containing activator contacts said mineral material feed during said flotation.

23. The method of claim 22 wherein:

said lead-containing activator comprises at least one of lead nitrate and lead acetate.

24. The method of claim 1, wherein:

a copper-containing activator contacts said mineral material feed during said flotation.

25. The method of claim 1, wherein:

a xanthate collector contacts said mineral material feed during said flotation.

26. The method of claim 1, wherein:

during said flotation, said liquid medium is at an acidic pH.

27. The method of claim 1, wherein:

during said flotation, said liquid medium is at a pH of smaller than about pH 6.

28. The method of claim 1, wherein:

during said flotation, said liquid medium is at a pH of from about pH 3 to about pH 6.

29. The method of claim 1, wherein:

said flotation comprises a first flotation stage of said mineral material feed to produce a first flotation concentrate enriched, relative to said mineral material feed, in said at least one iron-containing sulfide and in gold and to produce a first flotation tail depleted, relative to said mineral material feed, in said at least one iron-containing sulfide and in gold;

said flotation further comprising a second flotation stage wherein at least a portion of said first flotation tail is subjected to further flotation to produce a second flotation concentrate enriched, relative to said first flotation tail, in said at least one iron-containing sulfide and in gold and to produce a second flotation tail depleted, relative to said first flotation tail, in said at least one iron-containing sulfide and in gold;

after said first flotation stage and prior to said second flotation stage, said first flotation tail being subjected to comminution to reduce the size of particles in said first flotation tail.

30. The method of claim 29, wherein:

after said comminution and prior to said second flotation stage, said first flotation tail is subjected to size separation to separate said first flotation tail into two fractions, a first fraction of smaller-size particles and a second fraction of larger-size particles, said second fraction being subjected to said second flotation stage and said first fraction not being subjected to said second flotation stage.

31. The method of claim 1, wherein:

said flotation is conducted in a sealed flotation apparatus having a vapor headspace above said liquid medium;

gas is withdrawn from said vapor headspace and recycled for introduction into said liquid medium to form at least a part of said flotation gas.

32. The method of claim 31, wherein:

said flotation apparatus comprises means for dispersing said flotation gas in said liquid medium, said means for dispersing creating a vacuum to suck said gas from said vapor headspace to introduce said gas into said liquid medium.

33. The method of claim 22, wherein:

said lead-containing activator includes lead in a +2 oxidation state.

34. The method of claim 22, wherein:

said flotation tail, after said step of flotation, is subjected to cyanide leaching to recover gold from said flotation tail.

35. The method of claim 34, wherein:

during said cyanide leaching of said flotation tail, consumption of cyanide is lower using said lead-containing activator relative to use of a copper-containing activator during said step of flotation.

36. The method of claim 22, wherein:

said flotation concentrate, after said step of flotation, is subjected to cyanide leaching to remove gold from said flotation concentrate.

37. The method of claim 36, wherein:

during said cyanide leaching of said flotation concentrate, consumption of cyanide is lower using said lead-containing activator relative to use of a copper-containing activator during said step of flotation.

38. The method of claim 22, wherein:

said liquid medium of said flotation comprises at least some recycled process water.

39. The method of claim 38, wherein:

said recycled process water includes cyanide.

40. The method of claim 39, wherein:

said lead-containing activator at least partially counters a depressing effect of said cyanide on said at least one iron-containing sulfide.

* * * * *